(12) United States Patent
Monden et al.

(10) Patent No.: US 8,541,334 B2
(45) Date of Patent: Sep. 24, 2013

(54) CATALYST CARRIER, CATALYST AND PROCESS FOR PRODUCING THE SAME

(75) Inventors: Ryuji Monden, Chiba (JP); Tadatoshi Kurozumi, Chiba (JP); Toshikazu Shishikura, Chiba (JP)

(73) Assignee: Showa Denko K.K., Tokyo (JP)

( * ) Notice: Subject to any disclaimer, the term of this patent is extended or adjusted under 35 U.S.C. 154(b) by 217 days.

(21) Appl. No.: 12/918,456

(22) PCT Filed: Feb. 10, 2009

(86) PCT No.: PCT/JP2009/052234
§ 371 (c)(1),
(2), (4) Date: Aug. 19, 2010

(87) PCT Pub. No.: WO2009/104500
PCT Pub. Date: Aug. 27, 2009

(65) Prior Publication Data
US 2010/0331172 A1 Dec. 30, 2010

(30) Foreign Application Priority Data

Feb. 20, 2008 (JP) ................. 2008-038969

(51) Int. Cl.
*B01J 27/22* (2006.01)
*B01J 27/228* (2006.01)
*B01J 27/24* (2006.01)
*C01B 21/12* (2006.01)
*C01C 3/14* (2006.01)

(52) U.S. Cl.
USPC ............ 502/179; 502/177; 502/200; 423/365

(58) Field of Classification Search
USPC ........................ 502/177, 179, 200; 423/365
See application file for complete search history.

(56) References Cited

U.S. PATENT DOCUMENTS

| 3,334,992 A | 8/1967 | Downing et al. |
| 3,383,196 A | 5/1968 | Carpenter |
| 3,492,100 A * | 1/1970 | Roubin et al. ................. 423/365 |

(Continued)

FOREIGN PATENT DOCUMENTS

| EP | 1 060 019 B1 | 10/2005 |
| EP | 2 198 962 A1 | 6/2010 |

(Continued)

OTHER PUBLICATIONS

Schur et al., "Niobium as a construction material for a hydrogen energy system",International Journal of Hydrogen Energy, vol. 20, No. 5, 1995, pp. 405-407.

(Continued)

*Primary Examiner* — Patricia L Hailey
(74) *Attorney, Agent, or Firm* — Sughrue Mion, PLLC

(57) ABSTRACT

The present invention provides a catalyst carrier having excellent durability and capable of attaining high catalytic ability without increasing the specific surface area thereof, and a catalyst obtainable by using the catalyst carrier. The catalyst carrier of the present invention comprises a metal oxycarbonitride, preferably the metal contained in the metal oxycarbonitride comprises at least one selected from the group consisting of niobium, tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, cerium, praseodymium, neodymium, promethium, samarium, europium, gadolinium, terbium, dysprosium, holmium, erbium, thulium, ytterbium, lutetium, and nickel. Moreover, the catalyst of the present invention comprises the catalyst carrier and a catalyst metal supported on the catalyst carrier.

15 Claims, 9 Drawing Sheets

(56) References Cited

U.S. PATENT DOCUMENTS

| | | | |
|---|---|---|---|
| 3,872,136 A * | 3/1975 | Middelhoek | 423/371 |
| 4,212,670 A * | 7/1980 | Shveikin et al. | 75/233 |
| 4,418,154 A | 11/1983 | McCandlish et al. | |
| 4,426,366 A * | 1/1984 | McCandlish et al. | 423/365 |
| 4,476,102 A | 10/1984 | McCandish et al. | |
| 4,581,289 A | 4/1986 | Dietrich et al. | |
| 4,657,776 A | 4/1987 | Dietrich et al. | |
| 4,699,800 A | 10/1987 | Dustmann et al. | |
| 4,828,664 A | 5/1989 | Dietrich et al. | |
| 5,417,952 A * | 5/1995 | Koc et al. | 423/380 |
| 5,811,624 A * | 9/1998 | Hantzer et al. | 585/700 |
| 6,132,695 A | 10/2000 | Barrera et al. | |
| 6,168,694 B1 * | 1/2001 | Huang et al. | 204/290.12 |
| 6,297,185 B1 | 10/2001 | Thompson et al. | |
| 7,194,315 B1 | 3/2007 | Platt et al. | |
| 2001/0032005 A1 | 10/2001 | Gelb et al. | |
| 2002/0013221 A1 * | 1/2002 | Thompson et al. | 502/177 |
| 2006/0019146 A1 | 1/2006 | Yoshitake et al. | |
| 2006/0160200 A1 | 7/2006 | Rathenow et al. | |
| 2006/0246344 A1 | 11/2006 | Halalay et al. | |
| 2006/0251954 A1 | 11/2006 | Merzougui et al. | |
| 2012/0065052 A1 * | 3/2012 | Ewald et al. | 502/5 |
| 2012/0115064 A1 * | 5/2012 | Wakizaka et al. | 429/483 |

FOREIGN PATENT DOCUMENTS

| | | |
|---|---|---|
| EP | 2239054 A1 * | 10/2010 |
| JP | 2002-273224 A | 9/2002 |
| JP | 2003-012375 A | 1/2003 |
| JP | 2003-342058 A | 12/2003 |
| JP | 2003-346814 A | 12/2003 |
| WO | WO 96/35004 A1 | 11/1996 |
| WO | 2006/002228 A2 | 1/2006 |
| WO | WO 2006/119407 A2 | 11/2006 |
| WO | 2009/031383 A1 | 3/2009 |

OTHER PUBLICATIONS

Canadian Office Action issued in Canadian Application No. 2722079 dated Feb. 20, 2012.

Y. Ohgi et al., "Catalytic activity of partially-oxidized transition metal carbonitrides for oxygen reduction reaction," The Electrochemical Society of Japan, Mar. 29, 2007, p. 94.

* cited by examiner

CATALYST CARRIER, CATALYST AND PROCESS FOR PRODUCING THE SAME

TECHNICAL FIELD

The present invention relates to a catalyst carrier, a catalyst and a process for producing the catalyst, more specifically, it relates to a catalyst carrier comprising a metal oxycarbonitride, a catalyst obtainable using the carrier and a process for producing the catalyst.

TECHNICAL BACKGROUND

Fuel cells are classified into various types in accordance with the kind of an electrolyte or the kind of an electrode. Typical examples are an alkali type, a phosphoric acid type, a molten carbonate type, a solid electrolyte type and a solid polymer type. Among them, the solid polymer type fuel cell capable of operating at a temperature of from a low temperature of about −40° C. to about 120° C. has been in the spotlight, and recently, the development and practical use thereof has been advanced as power sources having low environmental pollution used in automobiles. Driving sources for cars and fixed electric sources have been studied as the use of the solid polymer type fuel cell. In order to the cells to these uses, they are demanded to have durability for a long period of time.

The solid polymer type fuel cell has a form such that a polymer solid electrolyte is sandwiched between an anode and a cathode, a fuel is fed to the anode while oxygen or air is fed to the cathode and thereby oxygen is reduced in the cathode to produce electricity. Hydrogen, methanol or the like is mainly used as the fuel.

Conventionally, in order to enhance the reaction rate of a fuel cell and enhance the energy exchange efficiency of a fuel cell, a catalyst-containing layer (hereinafter sometimes referred to a catalyst layer for fuel cells) is provided on the cathode (air electrode) surface or the anode (fuel electrode) surface of a fuel cell.

As this catalyst, noble metals are generally used and further among the noble metals, platinum, which is stable at a higher electric potential and has high activity, has been used. As the carrier, which supports the catalyst metal, carbon has been used conventionally.

The catalytic ability of the carrier carbon can be enhanced only by increasing the specific surface area thereof. Therefore, the particle diameter of the carrier carbon needs to be diminished. However, the diminishing of the particle diameter of the carrier carbon has the technical limits. The catalyst obtainable by using the carrier carbon cannot secure sufficient catalytic ability.

Furthermore, the carbon has low heat resistance, and the carrier carbon corrodes and disappears with running the reaction in a fuel cell, so the catalyst metal particles such as Pt and the like which are supported on the carrier carbon are liberated from the carrier to cause a phenomenon such that the catalyst metal is flocculated. As a result, the effective area is lowered and the cell ability is also lowered.

In order to solve this problem, Patent document 1 discloses an electrode catalyst layer of a fuel cell which corrosion resistance is enhanced by thermally treating a carrier carbon at a high temperature (Patent Document 1).

However, there is no change in the structure that platinum and the like are directly supported on the carbon carrier, which suffers corrosion and disappearance in the noble electric potential environment, so the corrosion resistance is not vastly improved even by the above technique.

Patent Document 1: JP-A-2002-273224

DISCLOSURE OF INVENTION

Subject to be Solved by the Invention

The present invention is intended to solve the above problems associated with the prior arts, and it is an object of the present invention to provide a catalyst carrier having excellent durability and capable of exerting high catalytic ability without increasing the specific surface area, it is another object of the present invention to provide a catalyst obtainable by using the catalyst carrier and a process for producing the catalyst.

Means for Solving the Subject

The present inventors have been earnestly studied in order to solve the above problems associated with prior arts, and found that a catalyst carrier comprising a metal oxycarbonitride has high durability and can exert high catalytic ability without increasing the specific surface area thereof. As a result, the present invention has been accomplished.

The present invention relates to the following characteristics (1) to (9) for example.

(1) The catalyst carrier of the present invention comprises a metal oxycarbonitride.

(2) The catalyst carrier according to (1) is characterized in that the metal of the metal oxycarbonitride is at least one metal selected from the group consisting of niobium, tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, praseodymium, neodymium, promethium, samarium, europium, gadolinium, terbium, dysprosium, holmium, erbium, thulium, ytterbium, lutetium, and nickel.

(3) The catalyst carrier according to (1) is characterized in that the metal of the metal oxycarbonitride is niobium.

(4) The catalyst carrier according to (2) is characterized in that the metal oxycarbonitride has a composition represented by $MC_xN_yO_z$, wherein M is at least one metal selected from the group consisting of niobium, tin, indium, platinum, tantalum, zirconium, copper, iron, tungsten, chromium, molybdenum, hafnium, titanium, vanadium, cobalt, manganese, mercury, plutonium, gold, silver, iridium, palladium, yttrium, ruthenium, lanthanum, cerium, praseodymium, neodymium, promethium, samarium, europium, gadolinium, terbium, dysprosium, holmium, erbium, thulium, ytterbium, lutetium, and nickel, x, y and z are each a proportion of each atomic number and satisfy $0.01 \leq x \leq 2$, $0.01 \leq y \leq 2$, $0.01 \leq z \leq 3$ and $x+y+z \leq 5$.

(5) The catalyst of the present invention comprises a catalyst carrier as described in any one of (1) to (4) and a catalyst metal supported on the catalyst carrier.

(6) The catalyst according to (5) is characterized in that the catalyst metal is at least one selected from the group consisting of Pt, Ir, Ag, Pd and Ru.

(7) The catalyst according to (5) or (6) is characterized in that the catalyst metal comprises metal particles having an average particle diameter of 1 to 20 nm.

(8) The catalyst according to any one of (5) to (7) is characterized in that it is used for fuel cells.

(9) A process for producing a catalyst capable of supporting a catalyst metal on a catalyst carrier as described in any one of (1) to (4).

(10) The process for producing the catalyst according to (9) is characterized in that the catalyst metal is supported using a precursor of the catalyst.

Effect of the Invention

The catalyst carrier of the present invention has excellent heat resistance and can exert high catalytic ability without increasing the specific surface area.

BEST EMBODIMENT FOR CARRYING OUT THE INVENTION

Catalyst Carrier

Figure 1:
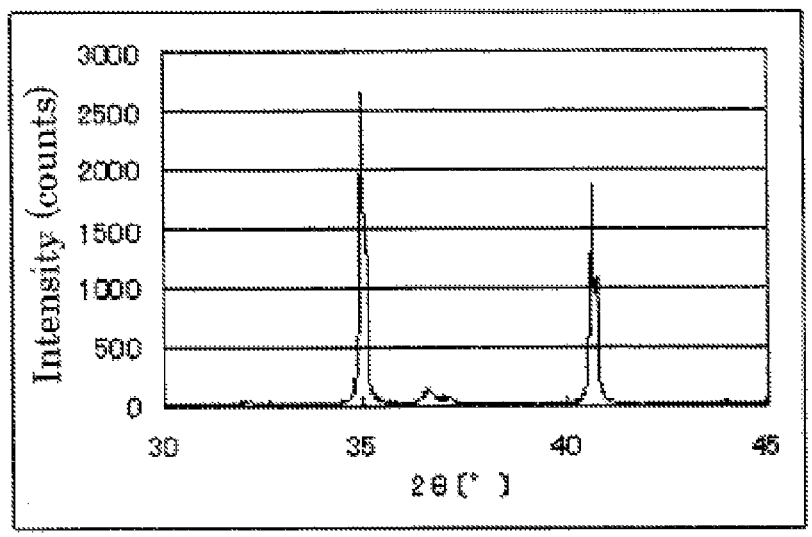
FIG. 1 is a powder X-ray diffraction spectrum of a catalyst carrier (1).

The catalyst carrier of the present invention comprises a metal oxycarbonitride.

The metal in the metal oxycarbonitride is preferably at least one metal selected from the group consisting of niobium, tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, praseodymium, neodymium, promethium, samarium, europium, gadolinium, terbium, dysprosium, holmium, erbium, thulium, ytterbium, lutetium and nickel (hereinafter optionally referred to "metal M"). The catalyst carrier made from the oxycarbonitride of the metal particularly has excellent durability and can exert high catalytic ability without increasing the specific surface area.

Among these metals, niobium is particularly preferred. Furthermore, it is preferred to employ the combined use of niobium and at least one metal selected from the group consisting of tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, praseodymium, neodymium, promethium, samarium, europium, gadolinium, terbium, dysprosium, holmium, erbium, thulium, ytterbium, lutetium, and nickel (hereinafter optionally referred to "metal M'").

The metal oxycarbonitride has a composition represented by $MC_xN_yO_z$. In the formula, M is at least one metal selected from the group consisting of niobium, tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, praseodymium, neodymium, promethium, samarium, europium, gadolinium, terbium, dysprosium, holmium, erbium, thulium, ytterbium, lutetium, and nickel, x, y and z are each a proportion of each atomic number and satisfy $0.01 \leq x \leq 2$, $0.01 \leq y \leq 2$, $0.01 \leq z \leq 3$ and $x+y+z \leq 5$.

When the metal of the metal oxycarbonitride is niobium, the metal oxycarbonitride has a composition represented by $NbC_xN_yO_z$.

In the formula, x, y and z are each a proportion of each atomic number and satisfy $0.01 \leq x \leq 2$, $0.01 \leq y \leq 2$, $0.01 \leq z \leq 3$ and $x+y+z \leq 5$.

When the metal of the metal oxycarbonitride is niobium and at least one metal selected from the group consisting of tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, praseodymium, neodymium, promethium, samarium, europium, gadolinium, terbium, dysprosium, holmium, erbium, thulium, ytterbium, lutetium and nickel, the metal oxycarbonitride has a composition represented by $Nb_aM'_bC_xN_yO_z$. In the formula, M' is at least one metal selected from the group consisting of tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, praseodymium, neodymium, promethium, samarium, europium, gadolinium, terbium, dysprosium, holmium, erbium, thulium, ytterbium, lutetium and nickel, a, b, x, y and z are each a proportion of each atomic number and when $a+b=1$, they satisfy $0.01 \leq a < 1$, $0 < b \leq 0.99$, $0.01 \leq x \leq 2$, $0.01 \leq y \leq 2$, $0.01 \leq z \leq 3$ and $x+y+z \leq 5$.

Each element proportion is preferably in the above range because the oxygen reducing potential tends to be higher.

The catalyst carrier of the present invention has an average particle diameter of, for example, 10 to 2000 nm, preferably 10 to 1000 nm. The average particle diameter is a value obtainable by the BET method. Even if the catalyst carrier of the present invention has a particle diameter in the above range, the catalyst prepared using the catalyst carrier has sufficiently high catalytic ability. When carbon is used as the catalyst carrier, the average particle diameter needs to be about 10 to 100 nm for increasing the specific surface area in order to attain the same catalytic ability. As described above, the catalyst carrier made from the metal oxycarbonitride of the present invention can secure sufficiently high catalytic ability without decreasing the particle diameter.

In the catalyst carrier of the present invention, it is preferred that two or more peaks be observed in the diffraction line at a diffraction angle 2θ between 33° to 43° by a powder X-ray diffraction method (Cu—Kα ray).

The peak in the diffraction pattern is a peak obtainable by a specific diffraction angle and specific diffraction intensity when a specimen (crystal form) is irradiated with an X-ray at various angles.

In the present invention, a signal detectable by a ratio (S/N) of signal (S) to noise (N) of not less than 2 is regarded to one peak in the diffraction line.

Herein, the noise (N) is a width of a base line.

As the X-ray diffraction method, for example, a powder X-ray analysis device: Rigaku RAD-RX can be used. The measurement can be carried out in the following measuring conditions that X-ray output (Cu—Kα) is 50 kV, 180 mA, the scanning axis is θ/2θ, the measuring range (2θ) is 10° to 89.98°, the measuring mode is FT, the reading width is 0.02°, the sampling time is 0.70 sec, DS, SS and RS are 0.5°, 0.5° and 0.15 mm respectively and the goniometer radius is 185 mm.

As the process for producing the catalyst carrier, which is not particularly limited, for example, there is a process including a step of preparing a metal oxycarbonitride by thermally treating a metal carbon nitride in an inert gas containing oxygen.

When the catalyst carrier comprises a metal oxycarbonitride containing a metal M, there is a process including a step of preparing a metal oxycarbonitride containing a metal M by thermally treating a metal carbon nitride containing a metal M in an inert gas containing oxygen.

When the catalyst carrier comprises a metal oxycarbonitride containing niobium and a metal M', there is a process including a step of preparing a metal oxycarbonitride containing niobium and a metal M' by thermally treating a metal carbon nitride containing niobium and a metal M' in an inert gas containing oxygen.

Examples of the process for preparing the metal carbon nitride may include (i) a process for producing the metal carbon nitride by thermally treating a mixture of a metal oxide and carbon in a nitrogen atmosphere and (ii) a process for producing the metal carbon nitride by thermally treating a mixture of a metal carbide, a metal oxide and a metal nitride in a nitrogen atmosphere.

Examples of the process for preparing the metal carbon nitride containing a metal M may include (I) a process for producing the metal carbon nitride by thermally treating a mixture of an oxide of the metal M and carbon in a nitrogen atmosphere, (II) a process for producing the metal carbon nitride by thermally treating a mixture of an oxide of the metal M, a carbide of the metal M and a nitride of the metal M in a nitrogen atmosphere and the like, and (III) a process for producing the metal carbon nitride by thermally treating a compound containing the metal M in a nitrogen atmosphere and the like.

Examples of the process for preparing the metal carbon nitride containing niobium and a metal M' may include (I') a process for producing the metal carbon nitride by thermally treating a mixture of an oxide of the metal M', niobium oxide and carbon in a nitrogen atmosphere, (II') a process for producing the metal carbon nitride by thermally treating a mixture of an oxide of the metal M', niobium carbide and a niobium nitride in a nitrogen atmosphere and the like, (III') a process for producing the metal carbon nitride by thermally treating a mixture of an oxide of the metal M', niobium carbide, niobium nitride and niobium oxide in a nitrogen atmosphere and the like, and (IV') a process for producing the metal carbon nitride by thermally treating a mixture of a compound containing the metal M' and a compound containing niobium in a nitrogen atmosphere and the like. However, the production process is not limited to these processes.

The process for producing the metal carbon nitride which metal is a metal M or which metals are niobium and a metal M' will be described below. The production of the metal oxycarbonitride which metal is niobium, zirconium, titanium or the like can be carried out in accordance with this production process.

(Production Process of the Metal Carbon Nitride)
<Production Process of the Metal Oxycarbonitride which Metal is a Metal M>
[Production Process (I)]

The production process (I) is a process for producing the metal carbon nitride by thermally treating the mixture of the oxide of the metal M and carbon in a nitrogen atmosphere.

In producing the metal carbon nitride, the heat treatment is carried out at a temperature of 600 to 1800° C., preferably 800 to 1600° C. The temperature of the heat treatment is preferably in the above range because the crystallinity and the uniformity are good. When the temperature of the heat treatment is lower than 600° C., the crystallinity tends to be inferior and the uniformity also tends to be inferior, while when it is higher than 1800° C., sintering tends to be caused.

Examples of the oxide of the metal M which is a raw material may include niobium oxide, tin oxide, indium oxide, platinum oxide, tantalum oxide, zirconium oxide, copper oxide, iron oxide, tungsten oxide, chromium oxide, molybdenum oxide, hafnium oxide, titanium oxide, vanadium oxide, cobalt oxide, manganese oxide, cerium oxide, mercury oxide, plutonium oxide, gold oxide, silver oxide, iridium oxide, palladium oxide, yttrium oxide, ruthenium oxide, lanthanum oxide, praseodymium oxide, neodymium oxide, promethium oxide, samarium oxide, europium oxide, gadolinium oxide, terbium oxide, dysprosium oxide, holmium oxide, erbium oxide, thulium oxide, ytterbium oxide, lutetium oxide and nickel oxide. It is possible to use at least one of them as the oxide of the metal M.

Examples of the raw material carbon may include carbon, carbon black, graphite, plumbago, active carbon, carbon nano tube, carbon nano fiber, carbon nano horn and fullerene. The carbon powder preferably has a small particle diameter, because it has a larger specific surface area and thereby is easily reacted with the oxide. For example, carbon black (specific surface area: 100 to 300 m²/g, XC-72 manufactured by Cabot Corporation) is preferably used.

The raw materials are not particularly limited. Even if any of the raw materials is used, the catalyst prepared from the metal oxycarbonitride obtainable by thermally treating the metal carbon nitride obtainable from the oxide of the metal M and carbon in an inert gas containing oxygen has a high starting potential for oxygen reduction and activity.

Controlling the mixing amount (molar ratio) of the oxide of the metal M and carbon, it is possible to prepare the appropriate metal carbon nitride.

In the mixing amount (molar ratio), the carbon is contained in an amount of usually 1 to 10 mol, preferably 2 to 6 mol per 1 mol of the metal M. Using the metal carbon nitride prepared by the mixing ratio in the above range, it is possible to prepare the metal oxycarbonitride capable of preparing the active catalyst having a high starting potential for oxygen reduction. Furthermore, using the metal carbon nitride prepared by the mixing ratio in the above range, it is possible to easily prepare the metal oxycarbonitride ($Nb_aM_bC_xN_yO_z$) in which the atomic number ratio (a, b, x, y and z) and x+y+z are appropriate.

[Production Process (II)]

The production process (II) is a process for producing the metal carbon nitride by thermally treating the mixture of an oxide of the metal M, a carbide of the metal M and a nitride of the metal M in a nitrogen atmosphere and the like.

In producing the metal carbon nitride, the heat treatment is carried out at the same temperature as that in the production process (I).

Examples of the oxide of the metal M, which is a raw material, may include the same oxides of the metal M as those described in the production process (I).

Examples of the carbide of the metal M which is a raw material may include niobium carbide, tin carbide, indium carbide, platinum carbide, tantalum carbide, zirconium carbide, copper carbide, iron carbide, tungsten carbide, chromium carbide, molybdenum carbide, hafnium carbide, titanium carbide, vanadium carbide, cobalt carbide, manganese carbide, mercury carbide, plutonium carbide, gold carbide, silver carbide, iridium carbide, palladium carbide, yttrium carbide, ruthenium carbide, lanthanum carbide, cerium carbide, praseodymium carbide, neodymium carbide, promethium carbide, samarium carbide, europium carbide, gadolinium carbide, terbium carbide, dysprosium carbide, holmium carbide, erbium carbide, thulium carbide, ytterbium carbide, lutetium carbide and nickel carbide. It is possible to use at least one of them as the carbide of the metal M.

Examples of the nitride of the metal M which is a raw material may include niobium nitride, tin nitride, indium nitride, platinum nitride, tantalum nitride, zirconium nitride, copper nitride, iron nitride, tungsten nitride, chromium nitride, molybdenum nitride, hafnium nitride, titanium nitride, vanadium nitride, cobalt nitride, manganese nitride, cerium nitride, mercury nitride, plutonium nitride, gold nitride, silver nitride, iridium nitride, palladium nitride, yttrium nitride, ruthenium nitride, lanthanum nitride, praseodymium nitride, neodymium nitride, promethium nitride, samarium nitride, europium nitride, gadolinium nitride, terbium nitride, dysprosium nitride, holmium nitride, erbium nitride, thulium nitride, ytterbium nitride, lutetium nitride and nickel nitride. It is possible to use at least one of them as the nitride of the metal M.

The raw materials are not particularly limited. Even if any of the raw materials is used, the catalyst prepared from the metal oxycarbonitride obtainable by thermally treating the metal carbon nitride obtainable from the oxide of the metal M, the carbide of the metal M and the nitride of the metal M in an inert gas containing oxygen has a high starting potential for oxygen reduction and activity.

Controlling the mixing amount (molar ratio) of the oxide of the metal M, the carbide of the metal M and the nitride of the metal M, it is possible to prepare the appropriate metal carbon nitride. In the mixing amount (molar ratio), usually the carbide of the metal M is contained in an amount of 0.01 to 500 mol, the oxide of the metal M is contained in an amount of 0.01 to 50 mol per 1 mol of the nitride of the metal M, preferably the carbide of the metal M is contained in an amount of 0.1 to 300 mol, the oxide of the metal M is contained in an amount of 0.01 to 30 mol per 1 mol of the nitride of the metal M. Using the metal carbon nitride prepared by the mixing ratio in the above range, it is possible to prepare the metal oxycarbonitride capable of preparing the active catalyst having a high starting potential for oxygen reduction. Furthermore, using the metal carbon nitride prepared by the mixing ratio in the above range, it is possible to easily prepare the metal oxycarbonitride ($Nb_aM_bC_xN_yO_z$) in which the atomic number ratio (a, b, x, y and z) and x+y+z are appropriate.

Moreover, even if using the mixture of only the carbide of the metal M and the nitride of the metal M, the metal carbon nitride can be prepared in the above manner.

[Production Process (III)]

The production process (III) is a process for producing the metal carbon nitride by thermally treating the compound containing the metal M in a nitrogen atmosphere and the like.

In producing the metal carbon nitride, the heat treatment is carried out at the same temperature as that in the production process (I).

Examples of the compound containing the metal M which is a raw material may include organic acid salts, carbonic acid salts, chlorides, organic complexes, carbides and nitrides of niobium, tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, praseodymium, neodymium, promethium, samarium, europium, gadolinium, terbium, dysprosium, holmium, erbium, thulium, ytterbium, lutetium and nickel. It is possible to use at least one of them as the compound containing the metal M.

The raw materials are not particularly limited. Even if any of the raw materials is used, the catalyst prepared from the metal oxycarbonitride obtainable by thermally treating the metal carbon nitride obtainable from the compound of the metal M in an inert gas containing oxygen has a high starting potential for oxygen reduction and activity.

Using the mixture only containing the compound containing the metal M other than the carbide and nitride, the carbide of the metal M and the nitride of the metal M, it is possible to prepare the metal carbon nitride similarly in the above manner.

<Production Process of the Metal Oxycarbonitride that the Metals are Niobium and the Metal M>

[Production Process (I')]

The production process (I') is a process for producing the metal carbon nitride by thermally treating the mixture of the oxide of the metal M', niobium oxide and carbon in a nitrogen atmosphere.

In producing the metal carbon nitride, the heat treatment is carried out at a temperature of 600 to 1800° C., preferably 800 to 1600° C. The temperature of the heat treatment is preferably in the above range because the crystallinity and the uniformity are good. When the temperature of the heat treatment is lower than 600° C., the crystallinity is inferior and the uniformity also is inferior, while when it is higher than 1800° C., sintering is easily caused.

Examples of the oxide of the metal M' which is a raw material may include tin oxide, indium oxide, platinum oxide, tantalum oxide, zirconium oxide, copper oxide, iron oxide, tungsten oxide, chromium oxide, molybdenum oxide, hafnium oxide, titanium oxide, vanadium oxide, cobalt oxide, manganese oxide, cerium oxide, mercury oxide, plutonium oxide, gold oxide, silver oxide, iridium oxide, palladium oxide, yttrium oxide, ruthenium oxide, lanthanum oxide, praseodymium oxide, neodymium oxide, promethium oxide, samarium oxide, europium oxide, gadolinium oxide, terbium oxide, dysprosium oxide, holmium oxide, erbium oxide, thulium oxide, ytterbium oxide, lutetium oxide and nickel oxide. It is possible to use at least one of them as the oxide of the metal M'.

Examples of the niobium oxide, which is a raw material, may include NbO, $NbO_2$ and $Nb_2O_5$.

Examples of the raw material carbon may include carbon, carbon black, graphite, plumbago, active carbon, carbon nano tube, carbon nano fiber, carbon nano horn and fullerene. The carbon powder preferably has a small particle diameter, because it has a larger specific surface area and thereby is easily reacted with the oxide. For example, carbon black (specific surface area: 100 to 300 $m^2/g$, XC-72 manufactured by Cabot Corporation) is preferably used.

The raw materials are not particularly limited. Even if any of the raw materials is used, the catalyst prepared from the metal oxycarbonitride obtainable by thermally treating the metal carbon nitride obtainable from the oxide of the metal M', niobium oxide and carbon in an inert gas containing oxygen has a high starting potential for oxygen reduction and activity.

Controlling the mixing amount (molar ratio) of the oxide of the metal M', niobium oxide and carbon, it is possible to prepare the appropriate metal carbon nitride.

In the mixing amount (molar ratio), the oxide of the metal M' is contained in an amount of 0.005 to 200 mol, and the carbon is contained in an amount of usually 1 to 1000 mol per 1 mol of niobium oxide, preferably the oxide of the metal M' is contained in an amount of 0.01 to 200 mol, and the carbon is contained in an amount of usually 2 to 600 mol per 1 mol of niobium oxide. Using the metal carbon nitride prepared by the mixing ratio in the above range, it is possible to prepare the metal oxycarbonitride capable of preparing the active catalyst having a high starting potential for oxygen reduction. Furthermore, using the metal carbon nitride prepared by the mixing ratio in the above range, it is possible to easily prepare the metal oxycarbonitride ($Nb_aM_bC_xN_yO_z$) in which the atomic number ratio (a, b, x, y and z) and x+y+z are appropriate.

[Production Process (II')]

The production process (II') is a process for producing the metal carbon nitride by thermally treating the mixture of an oxide of the metal M', a niobium carbide and a niobium nitride in a nitrogen atmosphere and the like.

In producing the metal carbon nitride, the heat treatment is carried out at the same temperature as that in the production process (I').

Examples of the oxide of the metal M', which is a raw material, may include the same oxides of the metal M' as those described in the production process (I').

Examples of the niobium carbide may include NbC and the like.

Examples of the niobium nitride may include NbN and the like.

The raw materials are not particularly limited. Even if any of the raw materials is used, the catalyst prepared from the metal oxycarbonitride obtainable by thermally treating the metal carbon nitride obtainable from the oxide of the metal M', the niobium carbide and the niobium nitride in an inert gas containing oxygen has a high starting potential for oxygen reduction and activity.

Controlling the mixing amount (molar ratio) of the oxide of the metal M', the niobium carbide and the niobium nitride, it is possible to prepare the appropriate metal carbon nitride. In the mixing amount (molar ratio), usually the niobium carbide is contained in an amount of 0.01 to 500 mol and the oxide of the metal M' is contained in an amount of 0.01 to 50 mol per 1 mol of the niobium nitride, preferably the niobium carbide is contained in an amount of 0.1 to 300 mol and the oxide of the metal M' is contained in an amount of 0.02 to 30 mol per 1 mol of the niobium nitride. Using the metal carbon nitride prepared by the mixing ratio in the above range, it is possible to prepare the metal oxycarbonitride capable of preparing the active catalyst having a high starting potential for oxygen reduction. Furthermore, using the metal carbon nitride prepared by the mixing ratio in the above range, it is possible to easily prepare the metal oxycarbonitride ($Nb_aM_bC_xN_yO_z$) in which the atomic number ratio (a, b, x, y and z) and x+y+z are appropriate.

[Production Process (III')]

The production process (III') is a process for producing the metal carbon nitride by thermally treating the mixture of an oxide of the metal M', niobium carbide, niobium nitride and niobium oxide in a nitrogen atmosphere and the like.

In producing the metal carbon nitride, the heat treatment is carried out at the same temperature as that in the production process (I').

Examples of the oxide of the metal M', which is a raw material, may include the same oxides of the metal M' as those described in the production process (I').

Examples of the niobium carbide may include NbC and the like.

Examples of the niobium nitride may include NbN and the like.

Examples of the niobium oxide may include NbO, $NbO_2$, $Nb_2O_5$ and the like.

The raw materials are not particularly limited. Even if any of the raw materials is used, the catalyst prepared from the metal oxycarbonitride obtainable by thermally treating the metal carbon nitride obtainable from the oxide of the metal M', the niobium carbide, the niobium nitride and the niobium oxide in an inert gas containing oxygen has a high starting potential for oxygen reduction and activity.

Controlling the mixing amount (molar ratio) of the oxide of the metal M', the niobium carbide, the niobium nitride and the niobium oxide, it is possible to prepare the appropriate metal carbon nitride. In the mixing amount (molar ratio), usually the niobium carbide is contained in an amount of 0.01 to 500 mol, and the oxide of the metal M' and the niobium oxide are contained in a total amount of 0.01 to 50 mol per 1 mol of the niobium nitride, preferably the niobium carbide is contained in an amount of 0.1 to 300 mol and the oxide of the metal M' and niobium oxide are contained in a total amount of 0.02 to 30 mol per 1 mol of the niobium nitride. Using the metal carbon nitride prepared by the mixing ratio in the above range, it is possible to prepare the metal oxycarbonitride capable of preparing the active catalyst having a high starting potential for oxygen reduction. Furthermore, using the metal carbon nitride prepared by the mixing ratio in the above range, it is possible to easily prepare the metal oxycarbonitride ($Nb_aM_bC_xN_yO_z$) in which the atomic number ratio (a, b, x, y and z) and x+y+z are appropriate.

[Production Process (IV')]

The production process (IV') is a process for producing the metal carbon nitride by thermally treating the mixture of a compound containing the metal M' and a compound containing niobium in a nitrogen atmosphere and the like.

In producing the metal carbon nitride, the heat treatment is carried out at the same temperature as that in the production process (I').

Examples of the compound containing the metal M' which is a raw material may include organic acid salts, carbonic acid salts, chlorides, organic complexes, carbides and nitrides of tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, praseodymium, neodymium, promethium, samarium, europium, gadolinium, terbium, dysprosium, holmium, erbium, thulium, ytterbium, lutetium and nickel. It is possible to use at least one of them as the compound containing the metal M'.

Examples of the compound containing niobium may include organic acid salts, carbonic acid salts, chlorides, organic complexes, carbides and nitrides of niobium. It is possible to use at least one of them as the compound containing niobium.

Even if using the mixture of the compound containing the metal M', niobium carbide and niobium nitride, it is possible to prepare the metal carbon nitride in which the metals are niobium and the metal M in the same manner as above.

The raw materials are not particularly limited. Even if any of the raw materials is used, the catalyst prepared from the metal oxycarbonitride obtainable by thermally treating the metal carbon nitride obtainable from the compound containing the metal M' and the compound containing niobium in an inert gas containing oxygen has a high starting potential for oxygen reduction and activity.

Controlling the mixing amount (molar ratio) of the compound containing the metal M' and the compound containing niobium, it is possible to prepare the appropriate metal carbon nitride. In the mixing amount (molar ratio), usually the compound containing niobium is contained in an amount of 0.005 to 500 mol per 1 mol of the compound containing the metal M', preferably the compound containing niobium is contained in an amount of from 0.01 to 300 mol per 1 mol of the compound containing the metal M'. Using the metal carbon nitride prepared by the mixing ratio in the above range, it is possible to prepare the metal oxycarbonitride capable of preparing the active catalyst having a high starting potential for oxygen reduction. Furthermore, using the metal carbon nitride prepared by the mixing ratio in the above range, it is possible to easily prepare the metal oxycarbonitride ($Nb_aM_b C_xN_yO_z$) in which the atomic number ratio (a, b, x, y and z) and x+y+z are appropriate.

(Production Process of Metal Oxycarbonitride)

Next, the process for preparing the metal oxycarbonitride by thermally treating the metal carbon nitride prepared in each of the production processes (I) to (III) and (I') to (IV') in an inert gas containing oxygen will be described.

Examples of the inert gas may include nitrogen, helium gas, neon gas, argon gas, krypton gas, xenon gas and radon gas. The nitrogen gas and argon gas are particularly preferred in the viewpoint of easy acquisition thereof.

The oxygen concentration in the process, which depends on the heat treating time and the heat treating temperature, is preferably 0.1 to 10% by volume, furthermore preferably 0.5 to 5% by volume. The oxygen concentration is preferably in the above range because a uniform oxycarbonitride is formed. When the oxygen concentration is less than 0.1% by volume, oxidation conditions tend to be immature, while when it is over 10% by volume, oxidation tends to proceed excessively.

The inert gas preferably contains hydrogen gas in an amount of not more than 5% by volume. The amount of hydrogen gas contained is more preferably 0.01 to 4% by volume, furthermore preferably 0.1 to 4% by volume. The % by volume used in the present invention is a value in a standard condition.

The temperature of the heat treatment in the process is usually 400 to 1400° C., preferably 600 to 1200° C. The heat-treating temperature is preferably in the above range because a uniform metal oxycarbonitride is formed. When the heat-treating temperature is lower than 400° C., oxidation tends to not proceed, while when it is over 1400° C., oxidation tends to proceed excessively and thereby the metal oxycarbonitride grows into crystals.

Examples of the heat treatment method in the process may include a standing method, a stirring method, a dropping method and a powder capturing method.

The dropping method is a method, which comprises heating an inducing furnace to a predetermined heat treating temperature while passing an inert gas containing a slight amount of oxygen into the furnace, keeping thermal balance at the temperature and then dropping a metal carbon nitride in a crucible that is in the heating zone of the furnace and thereby carrying out the heat treatment. The dropping method is preferable because it is possible to depress the cohesion and growth of the metal carbon nitride particles at the bare minimum.

The powder capturing method is a method, which comprises making the metal carbon nitride into spray and thereby being floated in an inert gas atmosphere containing a slight amount of oxygen, capturing the metal carbon nitride in a vertical tube-like furnace kept at a predetermined temperature for the heat treatment and thereby carrying out heat treatment.

In the dropping method, the time of the heat treatment for the metal carbon nitride is usually 0.5 to 10 min, preferably 0.5 to 3 min. The time of the heat treatment is preferably in the above range because the uniform oxycarbonitride tends to be formed. When the time of the heat treatment is less than 0.5 min, the metal oxycarbonitride tends to be partly formed, while when it is over 10 min, oxidation tends to proceed excessively.

In the powder capturing method, the time of the heat treatment for the metal carbon nitride is usually 0.2 sec to 1 min, preferably 0.2 to 10 sec. The time of the heat treatment is preferably in the above range because the uniform oxycarbonitride tends to be formed. When the time of the heat treatment is less than 0.2 sec, the metal oxycarbonitride tends to be partly formed, while when it is over 1 min, oxidation tends to proceed excessively. In the heat treatment using the tube-like furnace, the time of the heat treatment for the metal carbon nitride is usually 0.1 to 10 hr, preferably 0.5 to 5 hr. The time of the heat treatment is preferably in the above range because the uniform oxycarbonitride tends to be formed. When the time of the heat treatment is less than 0.1 hr, the metal oxycarbonitride tends to be partly formed, while when it is over 10 hr, oxidation tends to proceed excessively.

When the catalyst is produced from the metal oxycarbonitride, the metal oxycarbonitride prepared in the above production process may be used as it is, or the resulting metal oxycarbonitride may be further pulverized to prepare the finely powdery metal oxycarbonitride and the finely powdery one may be used.

Examples of the method of pulverizing the metal oxycarbonitride may include methods by a roll rotating mill, a ball mill, a medium stirring mill, a gas stream pulverizing machine, a mortar and a pulverizing vessel. The method using the gas stream pulverizing machine is preferable in the viewpoint of making the metal oxycarbonitride into more fine particles, while the method using the mortar is preferable in the viewpoint of easily treating a small amount of the metal oxycarbonitride.

<Catalyst>

The catalyst of the present invention comprises the catalyst carrier and the catalyst metal supported on the catalyst carrier.

Non-limiting examples of the metal catalyst may include known catalyst metals, such as Pt, Ir, Ag, Pd and Ru. These catalyst metals may be used singly or two or more may be used in combination. Among them, Pt is preferable because of having high mass activity.

The catalyst metal supported on the catalyst carrier is usually a particulate metal. The particulate metal has an average particle diameter of preferably 1 to 20 nm, more preferably 1 to 10 nm. This average particle diameter is a number determined by the BET method. When the particulate metal has an average particle diameter in the above range, it has high catalyst activity.

In the catalyst of the present invention, the mass ratio of the catalyst carrier to the catalyst metal supported (catalyst carrier/catalyst metal) is in the range of 100/0.01 to 100/70, preferably 100/0.1 to 100/60.

The catalyst of the present invention has a starting potential for oxygen reduction, as measured in according to the following measuring method (A), of preferably not less than 0.5 V (vs. NHE) on the basis of a reversible hydrogen electrode.
Measuring Method (A):

The catalyst and carbon are fed to a solvent in such an amount that the amount of the catalyst dispersed in carbon, which is electronic conductive particles, is 1% by weight, and stirred with an ultrasonic wave to prepare a suspension. As the carbon, carbon black (specific surface area: 100 to 300 m$^2$/g) (for example, XC-72 manufactured by Cabot Co.) is used and the catalyst and the carbon are dispersed in a weight ratio of 95/5. Moreover, the solvent having a weight ratio of isopropyl alcohol to water of 2/1 is used.

30 μl of the suspension is collected while applying an ultrasonic wave, and quickly dropped on a glassy carbon electrode (diameter: 5.2 mm) and dried at 120° C. for 1 hr. The catalyst-containing catalyst layer for fuel cells is formed on the glassy carbon electrode by the drying.

Next, Nafion® (5% Nafion solution (DE521) manufactured by DuPont Co.) is diluted 10 times with pure water and 10 μl of the diluted Nafion is dropped on the above catalyst layer for fuel cells and dried at 120° C. for 1 hr.

Using the resulting electrode thus prepared, polarization is performed in an oxygen atmosphere and in a nitrogen atmosphere in a 0.5 mol/dm$^3$ sulfuric acid solution at a temperature of 30° C. with a reversible hydrogen electrode in a sulfuric acid solution having the same concentration as a reference electrode at a potential scanning rate of 5 mV/sec and thereby the current-potential curve is measured. In the measurement, the potential at which the difference between the reducing current at an oxygen atmosphere and the reducing current at a nitrogen atmosphere becomes not less than 0.2 mA/cm$^2$ is taken as a starting potential for oxygen reduction.

When the starting potential for oxygen reduction is less than 0.7 V (vs. NHE), hydrogen peroxide sometimes generates in using the catalyst for a cathode of fuel cells. The starting potential for oxygen reduction is preferably not less than 0.85 V (vs. NHE) in order to reduce oxygen properly. Moreover, the starting potential for oxygen reduction is preferably higher, and does not have the upper limit particularly. The theoretical value is 1.23 V (vs. NHE).

The catalyst layer for fuel cells formed using the above catalyst according to the present invention is preferably used in an acidic electrolyte at a potential of not less than 0.4 V (vs. NHE). The upper limit of the potential is determined by the stability of the electrode. The catalyst layer can be used at an upper limiting potential at which oxygen is generated of about 1.23 V (vs. NHE).

When the potential is less than 0.4 V (vs. NHE), there is no problem in the viewpoint of stability of the niobium oxycarbonitride, but oxygen cannot be reduced properly. Therefore, as the catalyst layer for fuel cells, a membrane electrode conjugate contained in the fuel cells has inferior usefulness.

The catalyst of the present invention can be produced by supporting the catalyst metal on the catalyst carrier. The method for supporting the catalyst metal on the catalyst carrier is not particularly limited as long as the supporting can be carried out practically. Particularly, it is preferred to employ a method for supporting the catalyst metal using a precursor of the catalyst.

The precursor of the catalyst used herein is a substance capable of being the above catalyst metal by a prescribed treatment, such as platinic chloride, iridium chloride, silver nitrate or palladium chloride.

The method of supporting the precursor of the catalyst on the catalyst carrier in not particularly limited, and a method of applying a conventionally known technique of supporting the catalyst metal can be used. Non-limiting examples are:

(1) a method comprising a step that the catalyst carrier is dispersed in the catalyst precursor solution, dried and solidified by evaporation and a step of carrying out heat-treatment, (2) a method comprising a step that the catalyst carrier is dispersed in the catalyst precursor colloidal solution, the catalyst precursor colloid is adsorbed on the catalyst carrier and thereby the catalyst metal is supported on the catalyst carrier, and (3) a method comprising a step that the pH of a mixed solution of a solution containing one or more of the metal compounds which are raw materials for the catalyst precursor and the catalyst precursor colloidal solution is regulated and thereby a metal oxide, a water-containing oxide and a metal hydroxide are prepared and simultaneously the catalyst precursor colloid is adsorbed, and a step of drying thereof.

As the process for preparing the catalyst of the present invention, it is preferred to use the method (1) because the catalyst metal is highly dispersed and supported on the surface of the catalyst carrier and the desired catalyst is prepared.

As the method of dispersing and supporting the catalyst metal on the catalyst carrier by the steps of the method (1), it is possible to employ a usual impregnation method.

The catalyst precursor solution may be obtainable through the above steps by the catalyst metal (may be a reside after the heat treatment). Non-limiting examples thereof are a platinic chloride aqueous solution, iridium chloride, silver nitride and palladium chloride.

Although the content of the catalyst precursor in the catalyst precursor solution is not particularly limited, the content may be not higher than the saturation concentration. Nevertheless, the proper and necessary concentration is determined because when the concentration is low, it is necessary for regulation of the concentration to repeat the above step until the supported amount becomes the desired amount. The catalyst precursor solution has a catalyst precursor content, which is not limited, of about 0.01 to 50% by mass.

One examples of the supporting method may include the following method.

A solution prepared by suspending the catalyst carrier in distilled water is put on a hot plate and kept at a liquid temperature of 80° C. while stirring. The platinic chloride aqueous solution previously prepared is slowly added to the suspension over 30 min and after completion of the dropping, the mixture is stirred at 80° C. for 2 hr.

Next, a formaldehyde aqueous solution (trade one: 37% by mass) is slowly added to the suspension and after completion of the addition, the mixture is stirred at 80° C. for 1 hr.

After completion of the reaction, the suspension is cooled and filtered off. The crystal filtered is heated in a nitrogen stream at 400° C. for 2 hr, and thereby a platinum-supported carrier, which is the catalyst of the present invention, is prepared.

Meanwhile, the catalyst carrier and the platinic chloride are fully suspended in water and filtered off, and then the collected solid is dried at room temperature. This solid is dried in a drying oven at 120° C. for 12 hr, and thereafter the solid is reduced while passing through hydrogen with elevating the temperature to 350° C. for 2 hr to prepare the platinum-supported carrier, which is the carrier of the present invention.
<Use>

The catalyst of the present invention can be used as a catalyst for fuel cells, exhaust gas treatment or organic synthesis. As described above, the catalyst of the present invention can secure sufficiently large catalytic ability without decreasing the particle diameter thereof, and has excellent heat resistance. Particularly, the catalyst of the present invention is suitable for the catalyst for fuel cells.

The catalyst of the present invention can form a catalyst layer for fuel cells. Examples of the catalyst layer for fuel cells may include an anode catalyst layer and a cathode catalyst layer. The above catalyst can be used for any of the catalyst layers. Since the catalyst layer for fuel cells according to the present invention has high oxygen reducing ability and contains the catalyst incapable of corroding in a high potential in an acidic electrolyte, it is useful as a catalyst layer (catalyst layer for cathode) provided on a cathode of a fuel cell. Particularly, it is favorably used in the catalyst layer provided on the cathode of a membrane electrode conjugate, which is provided in the solid polymer type fuel cells.

EXAMPLES

The present invention will be described in more detail with reference to the following examples below, but it is not limited by these examples.

Various measurements in the examples and comparative examples are carried out in the following methods.
[Analysis Methods]
1. Powder X Ray Diffraction The powder X ray diffraction on a specimen was carried out using Rotar Flex manufactured by Rigaku Corporation and a X'Pert-Pro manufactured by PANalytical.

The number of diffraction peaks in the powder X-ray diffraction of each specimen was determined by regarding a signal, which can be detected in a ratio (S/N) of signal (S) to noise (N) of 2 or more, as one peak.

The noise (N) was taken as a width of a base line.
2. Element Analysis
Carbon: About 0.1 g of a specimen was weighed and measured by EMIA-110 manufactured by Horiba Ltd.
Nitrogen and Oxygen: About 0.1 g of a specimen was weighed, put and sealed in Ni-Cup. Thereafter, the specimen was measured by an ON analysis apparatus.
Niobium: About 0.1 g of a specimen was weighed in a platinum pan and thermally decomposed by addition of nitric acid-hydrofluoric acid. This thermally decomposed material was determined volumetrically, diluted and determined by ICP-MS.

Example 1

1. Preparation of Catalyst Carrier 4.96 g (81 mmol) of niobium carbide, 1.25 g (10 mmol) of niobium oxide and 0.54 g (5 mmol) of niobium nitride were fully mixed and heated in a nitrogen atmosphere at 1600° C. for 3 hr to prepare 2.70 g of niobium carbon nitride. The resulting sintered niobium carbon nitride was pulverized by a ball mill.

1.05 g of the niobium carbon nitride was heated in a tube-like furnace while feeding an argon gas containing 1% by volume of oxygen gas at 800° C. for 1 hr, and thereby 1.12 g of a niobium oxycarbonitride (hereinafter referred to "catalyst carrier (1)") was prepared.

The powder X-ray diffraction spectrum of the resulting catalyst carrier (1) is shown in Table 1. At the diffraction angle 2θ in the range of 33° to 43°, four diffraction line peaks were observed. The element analysis results of the catalyst carrier (1) are shown in Table 1.

TABLE 1

The element analysis results of the catalyst carrier (1) (wt %;
the parenthetic number is an element ratio to Nb)

| Niobium carbon nitride | Nb | C | N | O | Composition |
|---|---|---|---|---|---|
| Example 1 $NbC_{0.00}N_{0.49}$ | 76.5 (1) | 4.69 (0.53) | 4.28 (0.41) | 8.98 (0.76) | $NbC_{0.53}N_{0.41}O_{0.76}$ |

In the element analysis of the resulting niobium oxycarbonitride, the niobium oxycarbonitride had a composition $NbC_xN_yO_z$ in which x, y and Z were 0.53, 0.41 and 0.76 respectively in this order and the total of x, y and Z (X+Y+z) was 1.7.

2. Preparation of Catalyst (Method of Synthesizing a 10% by Weight Platinum Catalyst)

0.900 g of the niobium oxycarbonitride (the pulverized one was used: particle diameter of 100 nm) was added to 100 ml of distilled water and shaken for 30 min by an ultrasonic cleaner. The suspension was put on a hot plate and kept at a liquid temperature of 80° C. with stirring. To the suspension, sodium carbide (0.172 g) was added.

To 50 ml of distilled water, 266 mg (0.513 mmol: 100 mg in terms of the platinum amount) of platinic chloride ($H_2PtCl_6 \cdot 6H_2O$) was dissolved to prepare a solution. The solution was slowly added to the suspension over 30 min (the solution temperature was kept at 80° C.). After completion of the dropping, the suspension, as it is, was stirred at 80° C. for 2 hr.

Next, 10 ml of a formaldehyde aqueous solution (trade one: 37%) was slowly added to the suspension. After completion of the addition, the suspension was stirred at 80° C. for 1 hr.

After completion of the reaction, the suspension was cooled and filtered off. The crystal filtered was heated in a nitrogen stream at 400° C. for 2 hr to prepare 850 mg of a 10% platinum-supported carrier (catalyst (1)).

Figure 2:
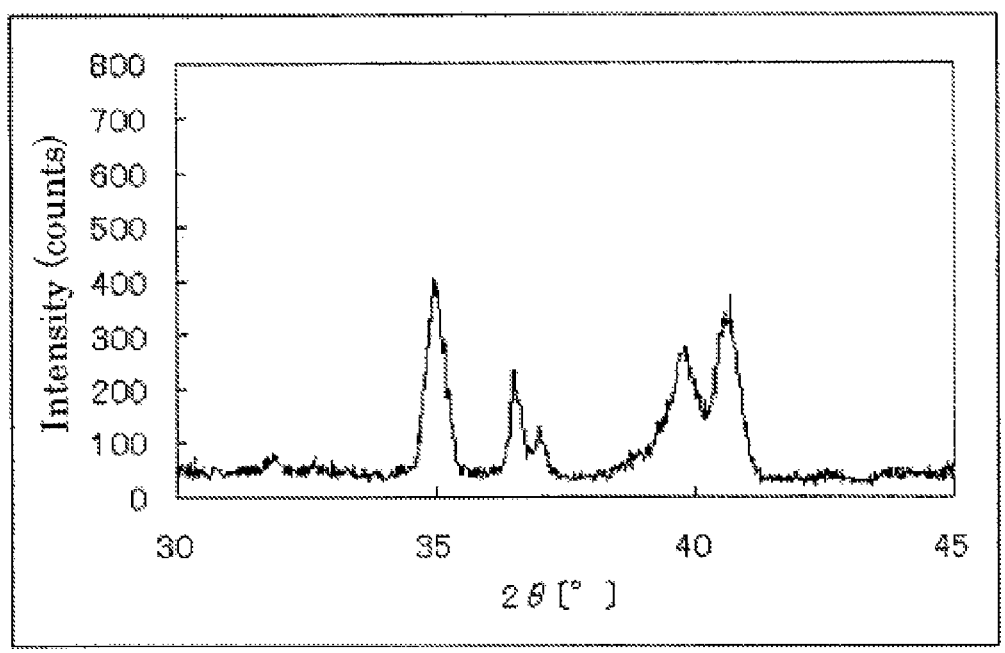
FIG. 2 is a powder X-ray diffraction spectrum of a catalyst (1) in Example 1.

The powder X-ray diffraction spectrum of the catalyst (1) is shown in FIG. 2. At the diffraction angle 2θ in the range of 33° to 43°, four diffraction line peaks were observed.

Furthermore, in the element analysis result of the catalyst (1), the amount of Pt was 8.5% by weight. The element analysis results of the catalyst (1) are shown in Table 2.

Figure 10:
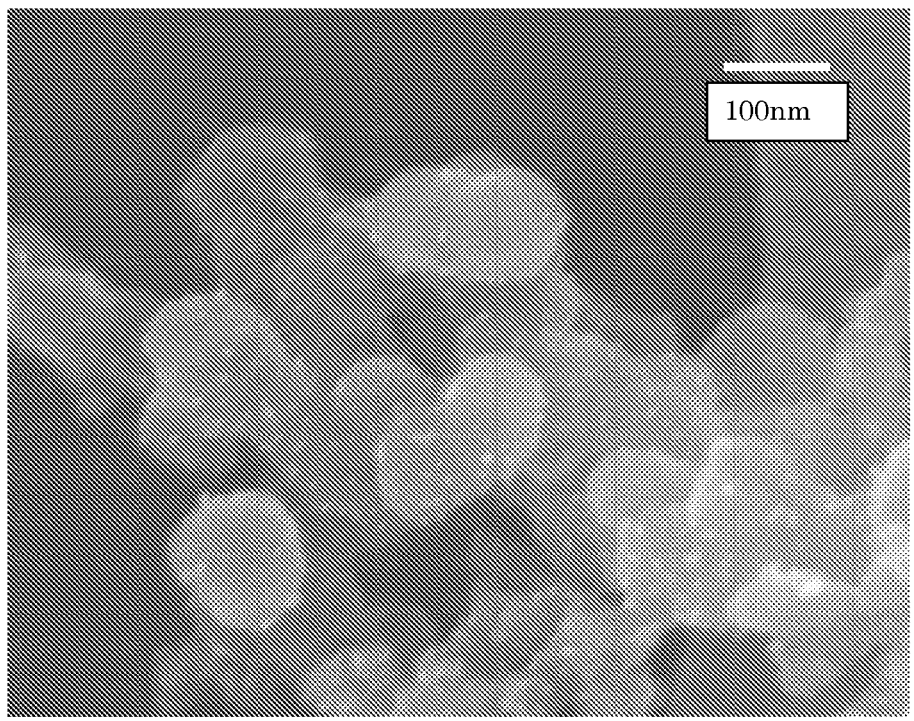
FIG. 10 is a SEM photograph of a carrier supporting platinum that platinum is supported on a niobium oxycarbonitride carrier in Example 1.

Moreover, the SEM photograph of the platinum-supported carrier that platinum was supported on the niobium oxycarbonitride carrier is shown in FIG. 10.

TABLE 2

|  | Nb | Pt | O | N | C |
|---|---|---|---|---|---|
| Example 1 | 63.6 | 8.5 | 22.8 | 2.8 | 1.4 |
| Example 2 | 78.3 | 2.3 | 7.4 | 6.1 | 3.9 |

(unit: % by weight)

3. Production of Electrode for Fuel Cells 0.095 g of the catalyst (1) and 0.005 g of carbon (XC-72 manufactured by Cabot Co.) were fed to 10 g of a mixed solution having a weight ratio of isopropyl alcohol to pure water of 2/1, stirred and suspended by an ultrasonic wave to prepare a mixture. 30 µl of this mixture was applied on a glassy carbon electrode (diameter: 5.2 mm manufactured by Tokai Carbon Co.) and dried at 120° C. for 1 hr. Furthermore, 10 µl of the diluted Nafion solution prepared by diluting Nafion (5% Nafion solution (DE521) manufactured by DuPont Co.) 10 times by pure water was applied and dried at 120° C. for 1 hr to prepare an electrode for fuel cells (1).

4. Evaluation on Oxygen Reducing Ability

The catalytic ability (oxygen reducing ability) of the electrode (1) for fuel cells thus prepared was evaluated by the following method.

At first, the electrode (1) for fuel cells thus prepared was polarized in an oxygen atmosphere and in a nitrogen atmosphere in a 0.5 mol/dm$^3$ sulfuric acid solution at 30° C. at a potential scanning rate of 5 mV/sec and the current-potential curve was measured. In the measurement, a reversible hydrogen electrode having the same concentration in the sulfuric acid solution was used as a reference electrode.

From the measurement results, the potential at which the difference of not less than 0.2 µA/cm$^2$ begins to appear between the reducing current in an oxygen atmosphere and the reducing current in a nitrogen atmosphere was taken a starting potential for oxygen reduction and the difference of the both was taken as an oxygen reducing current.

The catalytic ability (oxygen reducing ability) was evaluated on the electrode (1) for fuel cells prepared from this starting potential for oxygen reduction and the oxygen reducing current.

Namely, it shows that as the starting potential for oxygen reduction is higher or the oxygen reducing current is larger, the catalytic ability (oxygen reducing ability) of the electrode (1) for fuel cells is higher.

Figure 3:
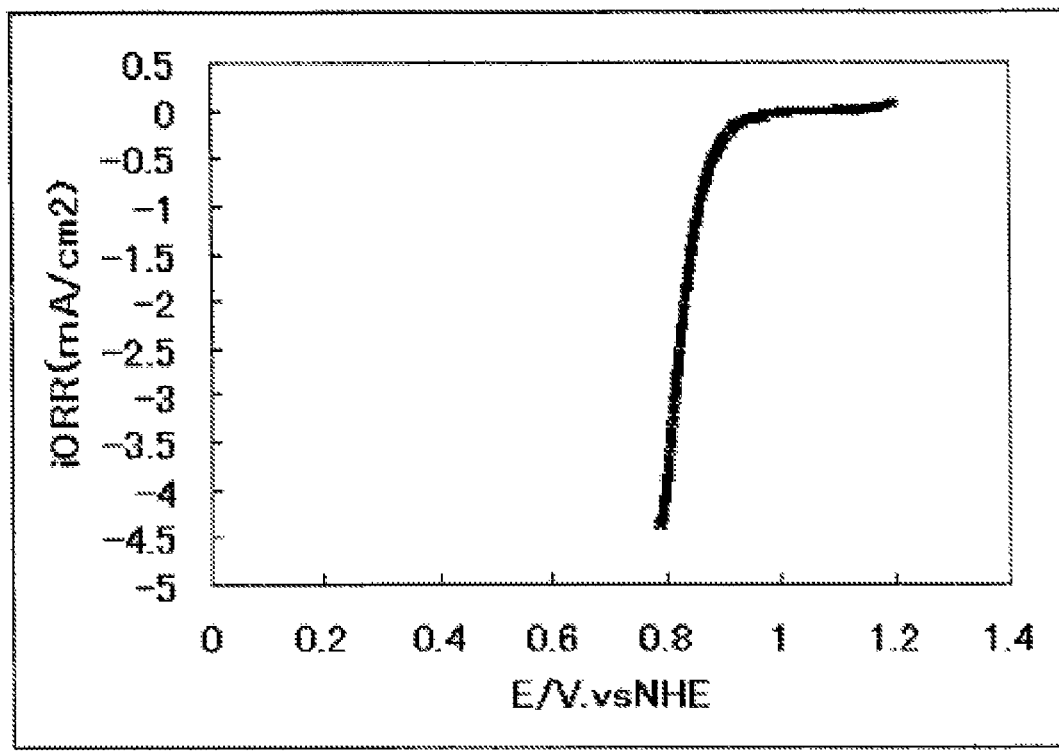
FIG. 3 is a graph showing an evaluation on oxygen reducing ability of an electrode (1) for fuel cells in Example 1.

The current-potential curve obtained from the above measurement is shown in FIG. 3.

The electrode (1) for fuel cells prepared in Example 1 was found to have a starting potential for oxygen reduction of 0.98 V (vs. NHE) and high oxygen reducing ability.

Example 2

1. Preparation of Catalyst (Method of Synthesizing a 2.5% by Weight Platinum Catalyst)

0.975 g of the niobium oxycarbonitride (the pulverized one was used: particle diameter of 100 nm) prepared in Example 1 was added to 100 ml of distilled water and shaken for 30 min by an ultrasonic cleaner. The suspension was put on a hot plate and kept at a liquid temperature of 80° C. with stirring. To the suspension, sodium carbide (0.043 g) was added.

To 25 ml of distilled water, 67 mg (0.134 mmol: 25 mg in terms of the platinum amount) of platinic chloride ($H_2PtCl_6.6H_2O$) was dissolved to prepare a solution. The solution was slowly added to the suspension over 30 min (the solution temperature was kept at 80° C.). After completion of the dropping, the suspension, as it is, was stirred at 80° C. for 2 hr.

Next, 5 ml of a formaldehyde aqueous solution (trade one: 37%) was slowly added to the suspension. After completion of the addition, the suspension, as it is, was stirred at 80° C. for 1 hr.

After completion of the reaction, the suspension was cooled and filtered off. The crystal filtered was heated in a nitrogen stream at 400° C. for 2 hr to prepare 800 mg of a 2.5% platinum-supported carrier (catalyst (2)).

Figure 4:
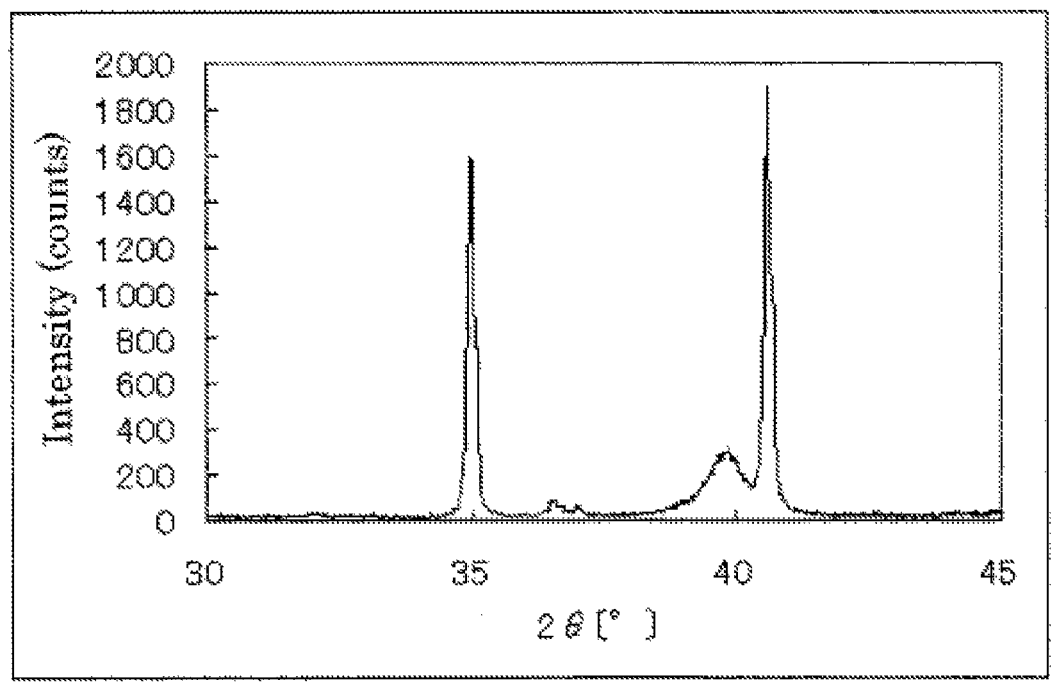
FIG. 4 is an X-ray diffraction spectrum of a powder of a catalyst (2) in Example 2.

The powder X-ray diffraction spectrum of the catalyst (2) is shown in FIG. 4. At a diffraction angle 2θ in the range of 33° to 43°, four diffraction line peaks were observed.

Furthermore, in the element analysis result of the catalyst (2), the amount of Pt was 2.3% by weight. The element analysis results of the catalyst (2) are shown in Table 2.

2. Production of Electrode for Fuel Cells 0.095 g of the catalyst (2) and 0.005 g of carbon (XC-72 manufactured by Cabot Co.) were fed to 10 g of a mixed solution having a weight ratio of isopropyl alcohol to pure water of 2/1, stirred and suspended by an ultrasonic wave to prepare a mixture. 30 µl of this mixture was applied on a glassy carbon electrode (diameter: 5.2 mm manufactured by Tokai Carbon Co.) and dried at 120° C. for 1 hr. Furthermore, 10 µl of the diluted Nafion solution prepared by diluting Nafion (5% Nafion solution (DE521) manufactured by DuPont Co.) 10 times by pure water was applied and dried at 120° C. for 1 hr to prepare an electrode (2) for fuel cells.

3. Evaluation on Oxygen Reducing Ability

The catalytic ability (oxygen reducing ability) of the electrode (2) for fuel cells thus prepared was evaluated by the following method.

At first, the electrode (2) for fuel cells thus prepared was polarized in an oxygen atmosphere and in a nitrogen atmosphere in a 0.5 mol/dm$^3$ sulfuric acid solution at 30° C. at a potential scanning rate of 5 mV/sec and the current-potential curve was measured. In the measurement, a reversible hydrogen electrode having the same concentration in the sulfuric acid solution was used as a reference electrode.

From the measurement results, the potential at which the difference of not less than 0.2 µA/cm2 begins to appear between the reducing current in an oxygen atmosphere and the reducing current in a nitrogen atmosphere was taken as a starting potential for oxygen reduction and the difference of the both was taken as an oxygen reducing current.

The catalyst ability (oxygen reducing ability) was evaluated on the electrode (2) for fuel cells prepared from this starting potential for oxygen reduction and the oxygen reducing current.

Namely, it shows that as the starting potential for oxygen reduction is higher or the oxygen reducing current is larger, the catalyst ability (oxygen reducing ability) of the electrode (2) for fuel cells is higher.

Figure 5:
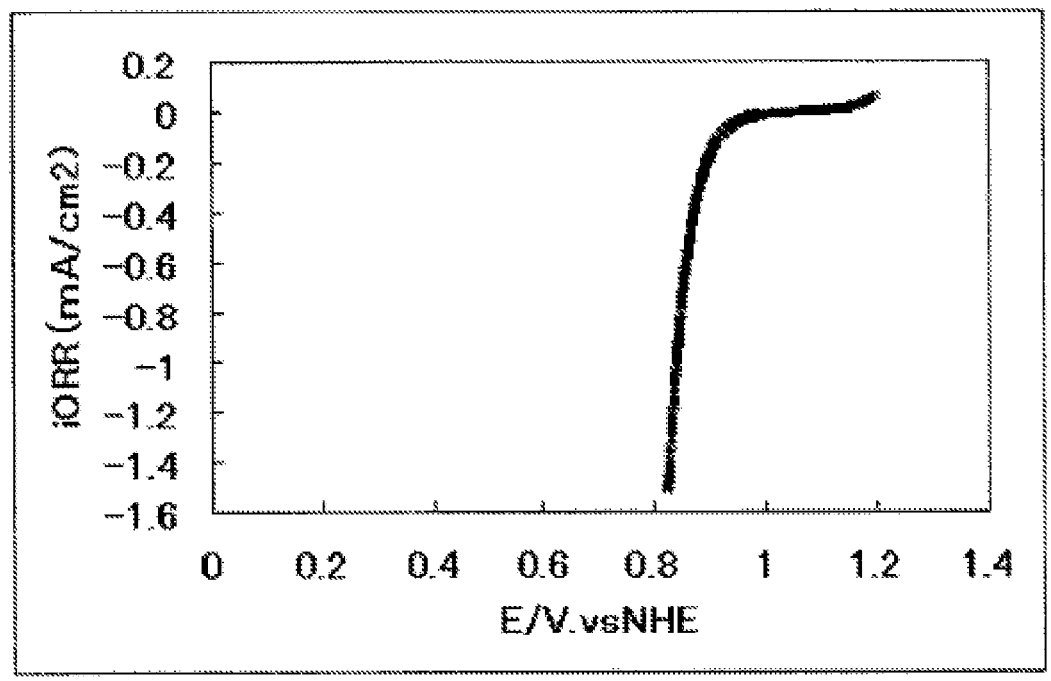
FIG. 5 is a graph showing an evaluation on oxygen reducing ability of an electrode (2) for fuel cells in Example 2.

The current-potential curve prepared from the above measurement is shown in FIG. 5.

The electrode (2) for fuel cells prepared in Example 2 was found to have a starting potential for oxygen reduction of 0.95 V (vs. NHE) and high oxygen reducing ability.

Comparative Example 1

Using 55.8% Pt/C manufactured Wako Pure Chemical Industries Ltd. as a catalyst (3), an electrode (3) for fuel cells was prepared and the production of an electrode for fuel cells and the evaluation on the oxygen reducing ability were carried out in the same manner as in Example 1.

Figure 6:
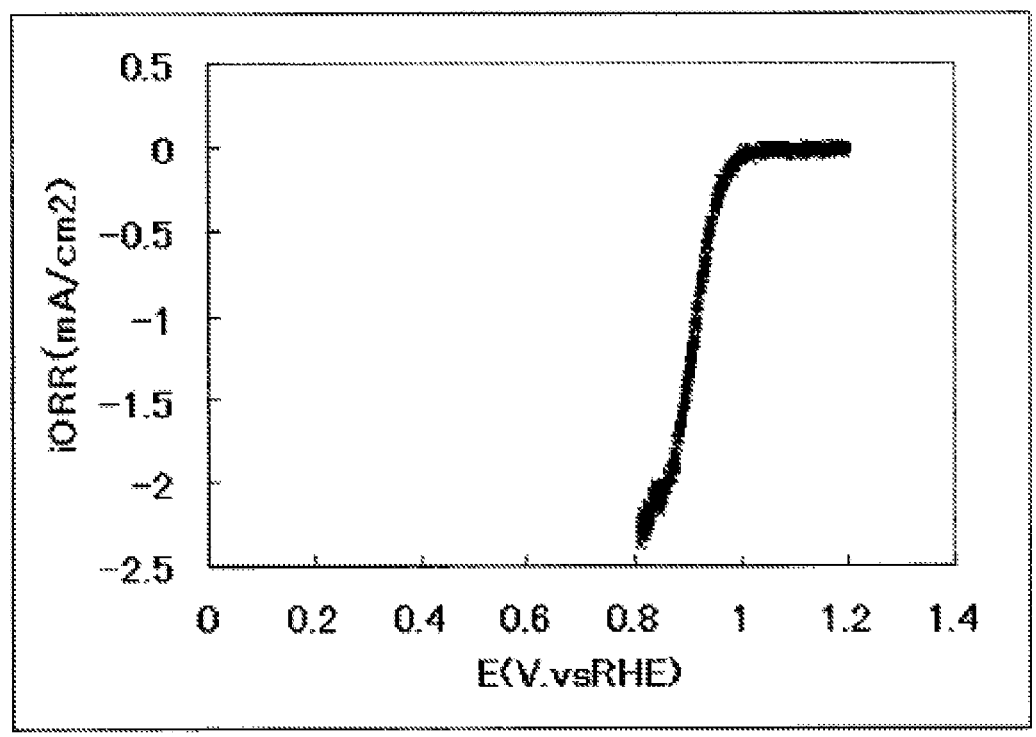
FIG. 6 is a graph showing an evaluation on oxygen reducing ability of an electrode (3) for fuel cells in Comparative Example 1.

The current-potential curve prepared from the same measurement as in the example is shown in FIG. 6.

The electrode (3) for fuel cells prepared in Comparative Example 1 was found to have a starting potential for oxygen reduction of 0.98 V (vs. NHE) and high oxygen reducing ability.

Figure 11:
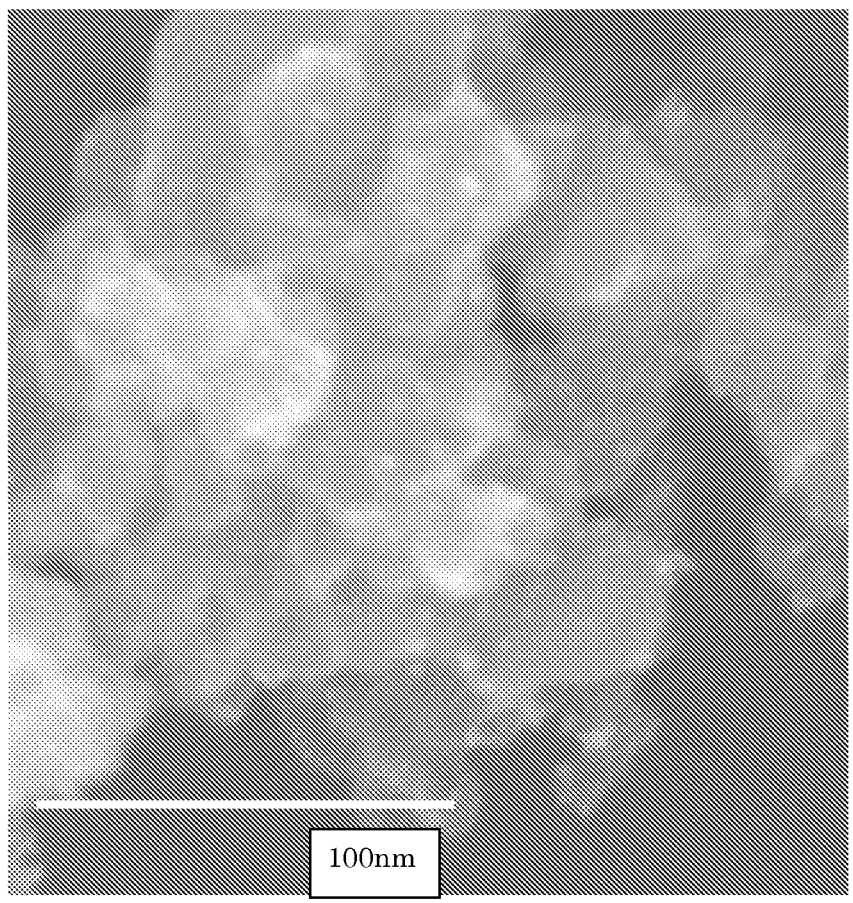
FIG. 11 is a SEM photograph of a carrier supporting platinum that platinum is supported on a carbon carrier in Comparative Example 1.
Figure 12:
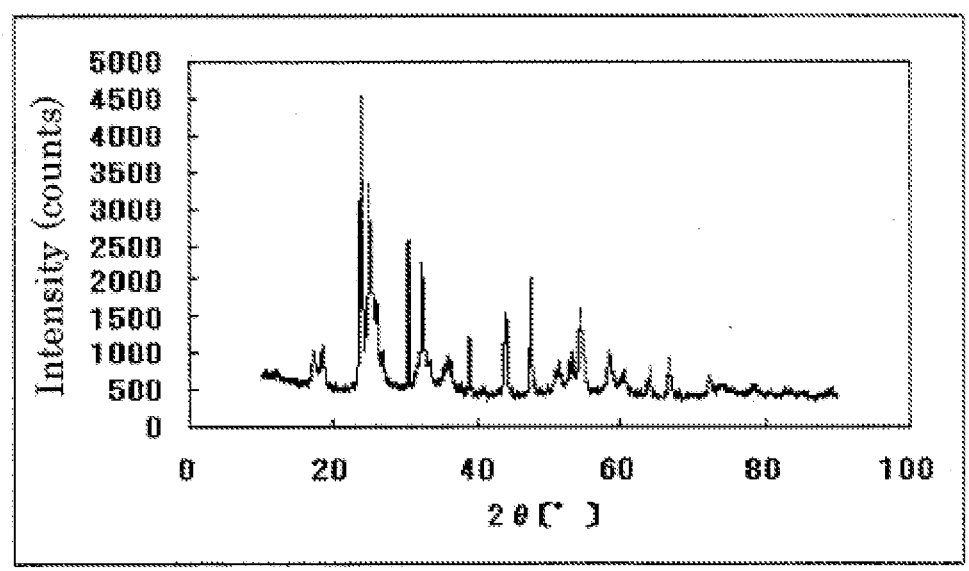
FIG. 12 is a powder X-ray diffraction spectrum of a catalyst (5) in Example 3.

The SEM photograph of the platinum-supported carbon that platinum was supported on the carbon carrier is shown in FIG. 11.

Comparative Example 2

Using 1% Pt/C manufactured Wako Pure Chemical Industries Ltd. as a catalyst (4), an electrode (4) for fuel cells was prepared and the production of an electrode for fuel cells and the evaluation on the oxygen reducing ability were carried out in the same manner as in Example 1.

Figure 7:
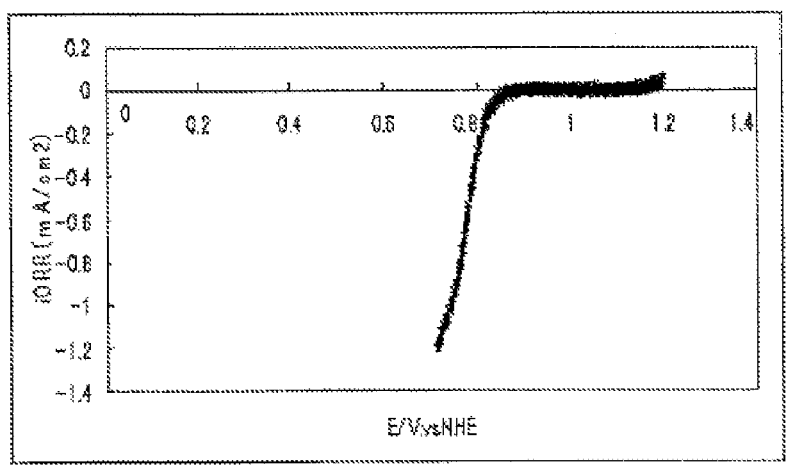
FIG. 7 is a graph showing an evaluation on oxygen reducing ability of an electrode (4) for fuel cells in Comparative Example 2.

The current-potential curve prepared from the same measurement as in the example is shown in FIG. 7.

The electrode (4) for fuel cells prepared in Comparative Example 2 was found to have a starting potential for oxygen reduction of 0.87V (vs. NHE) and to have not so high oxygen reducing ability as a platinum supported carrier.

Comparison Between the Examples and the Comparative Examples

Figure 8:
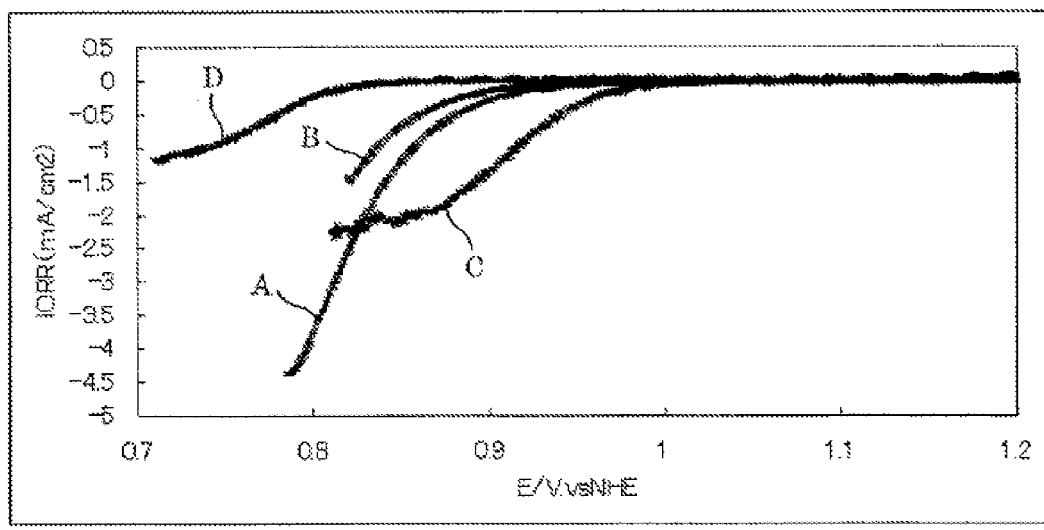
FIG. 8 is a view showing the graphs in the evaluation on oxygen reducing ability of the electrodes (2) for fuel cells in Examples 1 and 2 and Comparative Examples 1 and 2 together.

The current-potential curves obtained in Examples 1 and 2 and Comparative Examples 1 and 2 are inclusively shown in FIG. 8. In FIG. 8, A shows the current-potential curve obtained in Example 1 that 10% Pt/NbCNO was used, B shows the current-potential curve obtained in Example 2 that 2.5% Pt/NbCNO was used, C shows the current-potential curve obtained in Comparative Example 1 that 55.8% Pt/C was used and D shows the current-potential curve obtained in Comparative Example 2 that 1% Pt/C was used.

Figure 9:
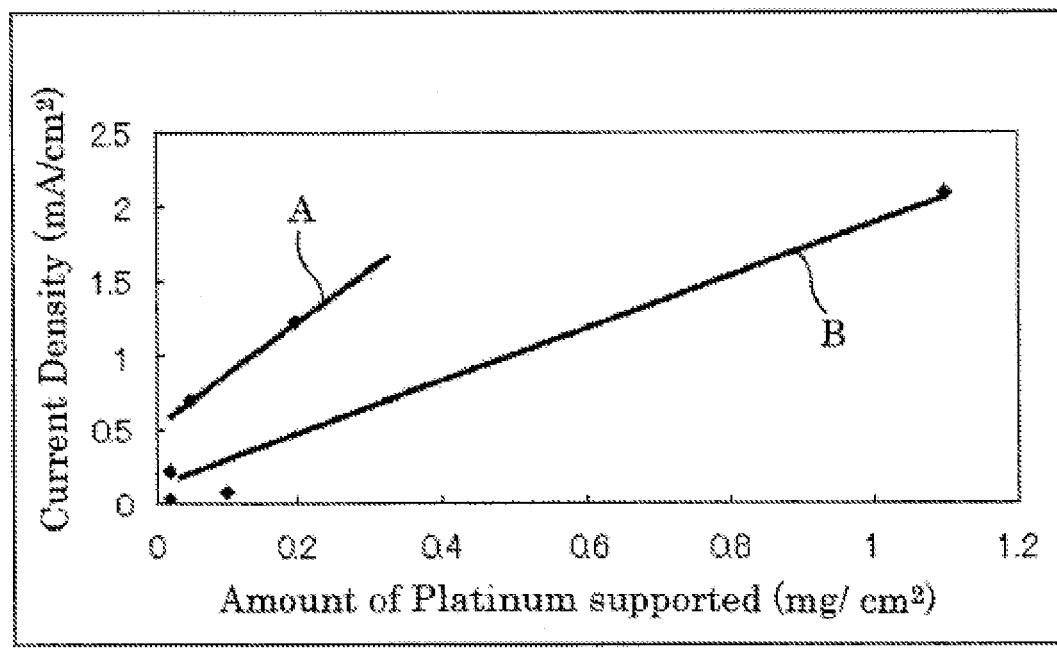
FIG. 9 is a view showing a comparison on current density at 0.85 V in each of Examples 1 and 2 and Comparative Examples 1 and 2.

The comparison on the current density at 0.85V between the platinum-supported NbCNO and the platinum-supported carbon prepared in Examples 1 and 2 and Comparative Examples 1 and 2 is shown in FIG. 9. In FIG. 9, A shows a straight line obtained from the measurement using the platinum-supported NbCNO and B shows a straight line obtained from the measurement using the platinum-supported carbon.

Example 3

1. Preparation of Catalyst Carrier 5.88 g (56 mmol) of niobium carbide, 0.87 g (5 mmol) of ferrous acetate and 5.14 g (48 mmol) of niobium nitride were fully mixed and heated in a nitrogen atmosphere at 1600° C. for 3 hr to prepare 10.89 g of iron and niobium-containing carbon nitride. Since the resulting iron and niobium-containing carbon nitride was sintered one, it was pulverized by a ball mill.

1.00 g of the iron and niobium-containing carbon nitride was heat-treated in a tube-like furnace while feeding a nitrogen gas containing 1% by volume of oxygen gas and 0.8% by volume of hydrogen gas at 900° C. for 6 hr, and thereby 1.24 g of a iron (5% by mole) and niobium-containing oxycarbonitride (hereinafter referred to "catalyst carrier (5)") was prepared.

The powder X-ray diffraction spectrum of the resulting catalyst carrier (5) is shown in Table 12. The element analysis results of the catalyst carrier (5) are shown in Table 3.

TABLE 3

| Example 3 | Nb | Fe | C | N | O | Composition |
|---|---|---|---|---|---|---|
| $NbFeC_{0.60}N_{0.49}$ | 67.2 (0.95) | 2.1 (0.05) | 3.2 (0.35) | 0.7 (0.07) | 28.6 (2.2) | $Nb_{0.95}Fe_{0.05}C_{0.35}N_{0.07}O_{2.2}$ |

(unit: % by weight; the parenthetic is an element ratio)

to Nb)

In the element analysis of the resulting iron and niobium-containing carbon nitride, the iron and niobium-containing oxycarbonitride had a composition $NbFeC_xN_yO_z$ in which x, y and Z were 0.35, 0.07 and 2.2 respectively in this order and the total of x, y and Z (X+Y+z) was 2.62.

2. Preparation of Catalyst (Method of Synthesizing a 10% by Weight Platinum Catalyst)

0.900 g of the iron and niobium-containing oxycarbonitride (the pulverized one was used: particle diameter of 100 nm) was added to 100 ml of distilled water and shaken for 30 min by an ultrasonic cleaner. The suspension was put on a hot plate and kept at a liquid temperature of 80° C. with stirring. To the suspension, sodium carbide (0.172 g) was added.

To 50 ml of distilled water, 266 mg (0.513 mmol: 100 mg in terms of the platinum amount) of platinic chloride ($H_2PtCl_6.6H_2O$) was dissolved to prepare a solution. The solution was slowly added to the suspension over 30 min (the solution temperature was kept at 80° C.). After completion of the dropping, the suspension, as it is, was stirred at 80° C. for 2 hr.

Next, 10 ml of a formaldehyde aqueous solution (trade one: 37%) was slowly added to the suspension. After completion of the addition, the suspension was stirred at 80° C. for 1 hr.

After completion of the reaction, the suspension was cooled and filtered off. The crystal filtered was heated in a nitrogen stream at 400° C. for 2 hr to prepare 846 mg of a 10% platinum-supported carrier (catalyst (5)).

Furthermore, in the element analysis results of the catalyst (5), the amount of Pt was 8.7% by weight. Using the catalyst (5), the production of a fuel cell electrode and the evaluation of the oxygen reducing ability were carried out in the same manner as in Example 1.

Figure 13:
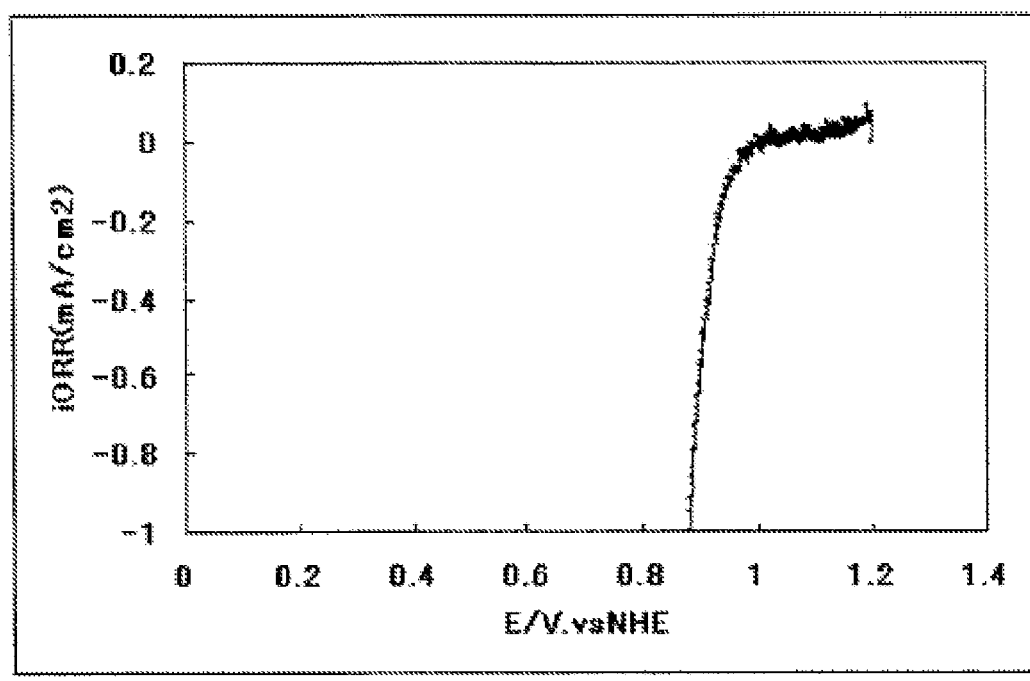
FIG. 13 is a graph showing an evaluation on oxygen reducing ability of an electrode (5) for fuel cells in Example 3.

The current-potential curve prepared from the above measurement, which was carried out in the same manner as in Example 1, is shown in FIG. 13.

The electrode (5) for fuel cells prepared in Example 3 was found to have a starting potential for oxygen reduction of 1.01 V (vs. NHE) and high oxygen reducing ability.

Example 4

1. Preparation of Catalyst Carrier 5.88 g (56 mmol) of zirconium carbide and 5.14 g (48 mmol) of zirconium nitride were fully mixed and heated in a nitrogen atmosphere at 1600° C. for 3 hr to prepare 10.89 g of zirconium-containing carbon nitride. Since the resulting zirconium-containing carbon nitride was sintered one, it was pulverized by a ball mill.

1.00 g of the zirconium-containing carbon nitride was heat-treated in a rotary kiln furnace while feeding a nitrogen gas containing 1% by volume of oxygen gas and 2% by volume of hydrogen gas at 1200° C. for 12 hr, and thereby 1.24 g of a zirconium-containing oxycarbonitride (hereinafter referred to "catalyst carrier (6)") was prepared.

Figure 14:
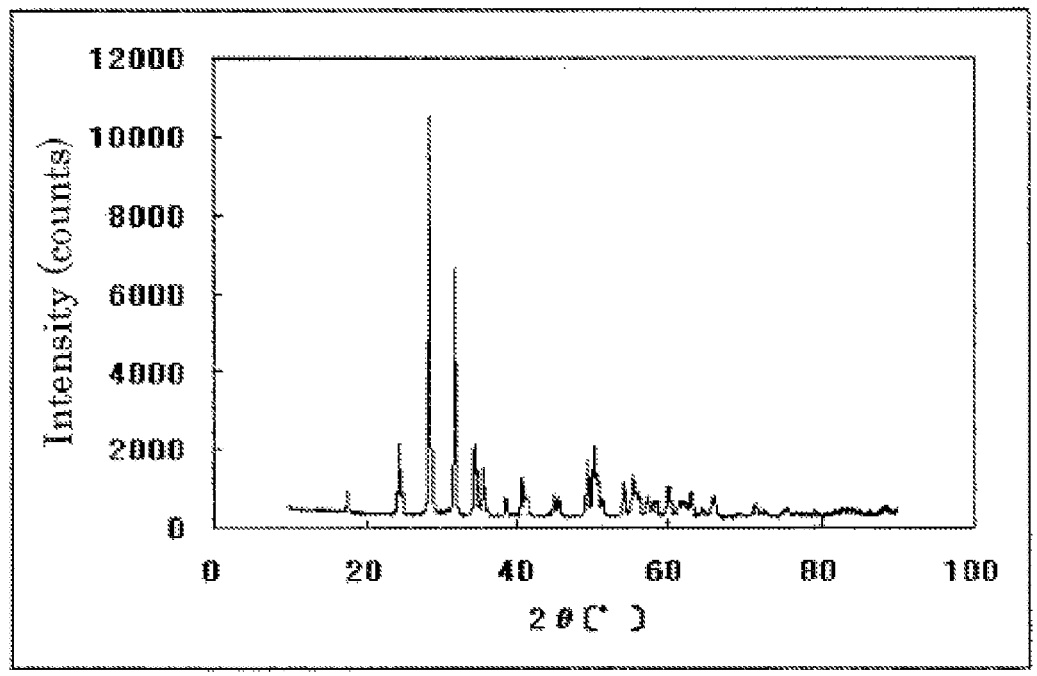
FIG. 14 is a powder X-ray diffraction spectrum of a catalyst (6) in Example 4.

The powder X-ray diffraction spectrum of the resulting catalyst carrier (6) is shown in FIG. 14.

2. Preparation of Catalyst (Method of Synthesizing a 10% by Weight Platinum Catalyst)

0.900 g of the zirconium-containing oxycarbonitride (the pulverized one was used: particle diameter of 100 nm) was added to 100 ml of distilled water and shaken for 30 min by an ultrasonic cleaner. The suspension was put on a hot plate and kept at a liquid temperature of 80° C. with stirring. To the suspension, sodium carbide (0.172 g) was added.

To 50 ml of distilled water, 266 mg (0.513 mmol: 100 mg in terms of the platinum amount) of platinic chloride ($H_2PtCl_6 \cdot 6H_2O$) was dissolved to prepare a solution. The solution was slowly added to the suspension over 30 min (the solution temperature was kept at 80° C.). After completion of the dropping, the suspension, as it is, was stirred at 80° C. for 2 hr.

Next, 10 ml of a formaldehyde aqueous solution (trade one: 37%) was slowly added to the suspension. After completion of the addition, the suspension, as it is, was stirred at 80° C. for 1 hr.

After completion of the reaction, the suspension was cooled and filtered off. The crystal filtered was heated in a nitrogen stream at 400° C. for 2 hr to prepare 828 mg of a 10% platinum-supported carrier (catalyst (6)).

Furthermore, in the element analysis results of the catalyst (6), the amount of Pt was 8.5% by weight. Using the catalyst (6), the production of a fuel cell electrode and the evaluation of the oxygen reducing ability were carried out in the same manner as in Example 1.

Figure 15:
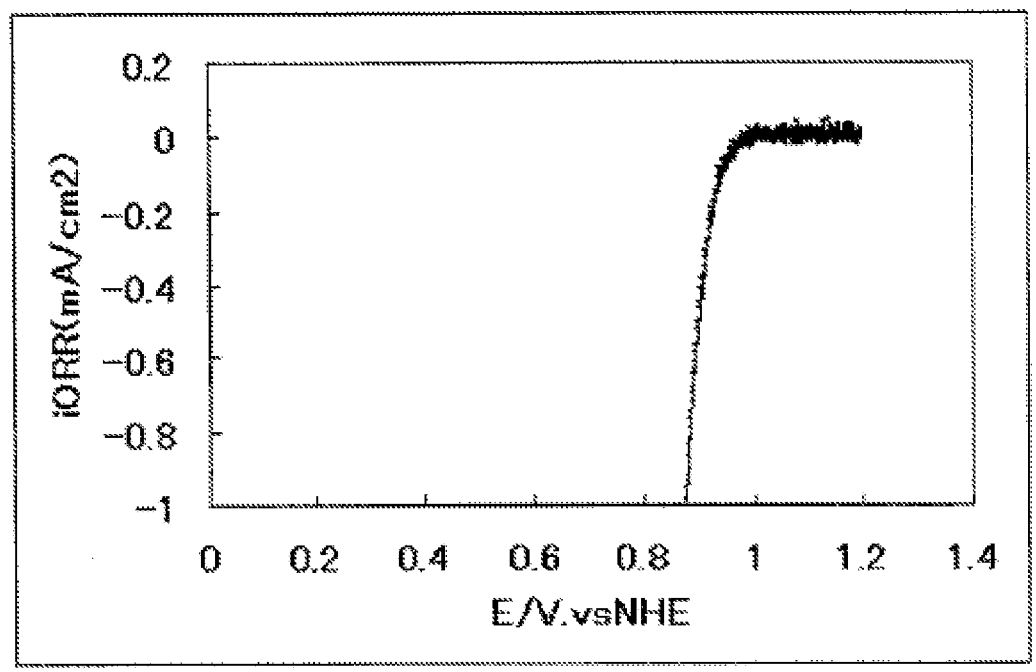
FIG. 15 is a graph showing an evaluation on oxygen reducing ability of an electrode (6) for fuel cells in Example 4.

The current-potential curve prepared from the above measurement, which was carried out in the same manner as in Example 1, is shown in FIG. 15.

The electrode (6) for fuel cells prepared in Example 4 was found to have a starting potential for oxygen reduction of 0.98 V (vs. NHE) and high oxygen reducing ability.

Example 5

1. Preparation of Catalyst Carrier 5.10 g (85 mmol) of titanium carbide, 0.80 g (10 mmol) of titanium oxide ($TiO_2$) and 0.31 g (5 mmol) of titanium nitride (TiN) were fully mixed and heated in a nitrogen atmosphere at 1800° C. for 3 hr to prepare 5.73 g of titanium carbon nitride. Since the resulting titanium carbon nitride was sintered one, it was pulverized by an automatic mortar.

1.00 g of the titanium-containing carbon nitride was heated in a tube-like furnace while feeding a nitrogen gas containing 1% by volume of oxygen gas and 4% by volume of hydrogen gas at 1000° C. for 10 hr, and thereby 1.31 g of a titanium-containing oxycarbonitride (hereinafter referred to "catalyst carrier (7)") was prepared.

Figure 16:
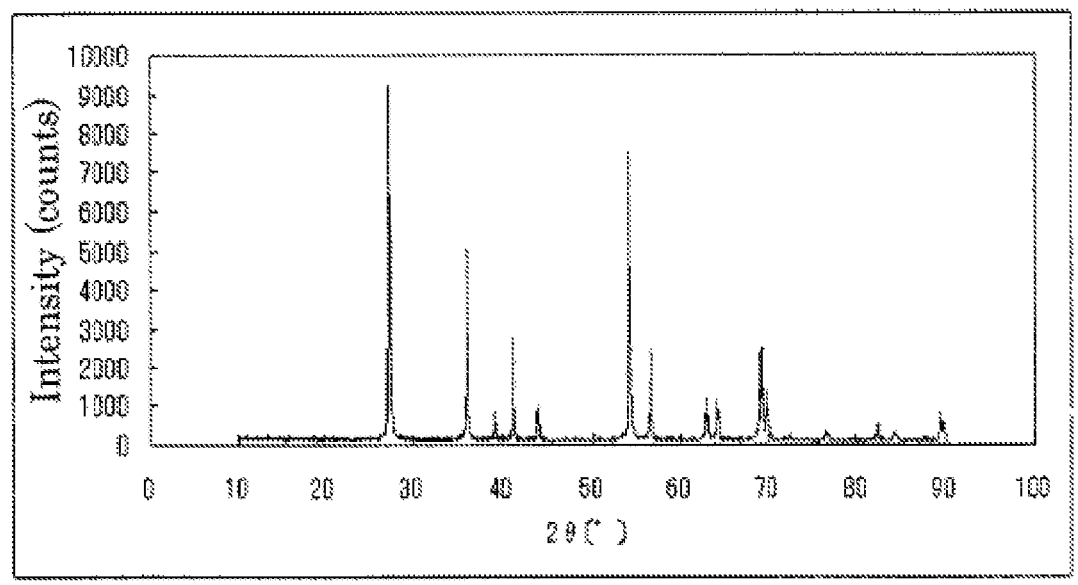
FIG. 16 is a powder X-ray diffraction spectrum of a catalyst (7) in Example 5.

The powder X-ray diffraction spectrum of the resulting catalyst carrier (7) is shown in FIG. 16. The element analysis results of the catalyst carrier (7) are shown in Table 4.

TABLE 4

| Example 5 | Ti | C | N | O | Composition |
|---|---|---|---|---|---|
| $TiC_{0.60}N_{0.50}$ | 61.7 (1) | 2.03 (0.13) | 0.62 (0.03) | 35.88 (1.74) | $TiC_{0.13}$-$N_{0.03}O_{1.74}$ |

(unit: wt %; the parenthetic number is an element ratio to Nb)

In the element analysis of the resulting titanium-containing oxycarbonitride, the titanium-containing oxycarbonitride had a composition $TiC_xN_yO_z$ in which x, y and Z were 0.13, 0.03 and 1.74 respectively in this order and the total of x, y and Z (X+Y+z) was 1.9.

2. Preparation of Catalyst (Method of Synthesizing a 10% by Weight Platinum Catalyst)

0.900 g of the titanium-containing oxycarbonitride (the pulverized one was used: particle diameter of 100 nm) was added to 100 ml of distilled water and shaken for 30 min by an ultrasonic cleaner. The suspension was put on a hot plate and kept at a liquid temperature of 80° C. with stirring. To the suspension, sodium carbide (0.172 g) was added.

To 50 ml of distilled water, 133 mg (0.256 mmol: 50 mg in terms of the platinum amount) of platinic chloride ($H_2PtCl_6 \cdot 6H_2O$) was dissolved to prepare a solution. The solution was slowly added to the suspension over 30 min (the solution temperature was kept at 80° C.). After completion of the dropping, the suspension, as it is, was stirred at 80° C. for 2 hr.

Next, 5 ml of a formaldehyde aqueous solution (trade one: 37%) was slowly added to the suspension. After completion of the addition, the suspension, as it is, was stirred at 80° C. for 1 hr.

After completion of the reaction, the suspension was cooled and filtered off. The crystal filtered was heated in a nitrogen stream at 400° C. for 2 hr to prepare 799 mg of a 5% platinum-supported carrier (catalyst (7)).

Furthermore, in the element analysis results of the catalyst (7), the amount of Pt was 4.4% by weight. Using the catalyst (7), the production of a fuel cell electrode and the evaluation of the oxygen reducing ability were carried out in the same manner as in Example 1.

Figure 17:
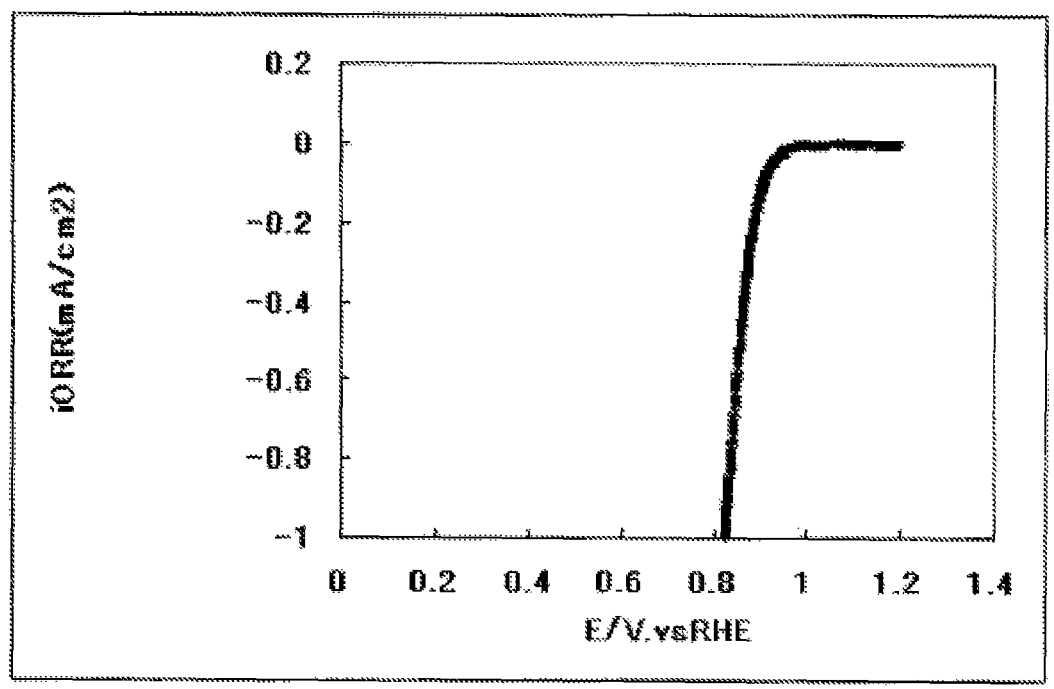
FIG. 17 is a graph showing an evaluation on oxygen reducing ability of an electrode (7) for fuel cells in Example 5.

The current-potential curve prepared from the above measurement, which was carried out in the same manner as in Example 1, is shown in FIG. 17.

The electrode (7) for fuel cells prepared in Example 5 was found to have a starting potential for oxygen reduction of 1.00 V (vs. NHE) and high oxygen reducing ability.

POSSIBILITY OF INDUSTRIAL USE

The catalyst carrier of the present invention has excellent heat resistance and can attain high catalyst ability without increasing the specific surface area thereof. Accordingly, the catalyst carrier can be favorably used for various catalysts, particularly catalysts for fuel cells.

The invention claimed is:

1. A catalyst comprising a catalyst carrier comprising a metal oxycarbonitride and a catalyst metal supported on the catalyst carrier,
wherein the catalyst metal is at least one selected from the group consisting of Pt, Ir, Ag, Pd and Ru.

2. The catalyst according to claim 1, wherein the metal of the metal oxycarbonitride is at least one metal selected from the group consisting of niobium, tin, indium, platinum, tantalum, zirconium, copper, iron, tungsten, chromium, molybdenum, hafnium, titanium, vanadium, cobalt, manganese, mercury, plutonium, gold, silver, iridium, palladium, yttrium, ruthenium, lanthanum, cerium, praseodymium, neodymium, promethium, samarium, europium, gadolinium, terbium, dysprosium, holmium, erbium, thulium, ytterbium, lutetium, and nickel.

3. The catalyst according to claim 1, wherein the metal of the metal oxycarbonitride is niobium.

4. The catalyst according to claim 1, wherein the metal oxycarbonitride has a composition represented by $MC_xN_yO_z$ in which M is at least one metal selected from the group consisting of niobium, tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, praseodymium, neodymium, promethium, samarium, europium, gadolinium, terbium, dysprosium, holmium, erbium, thulium, ytterbium, lutetium, and nickel, x, y and z are each a proportion of each atomic number and satisfy $0.01 \leq x \leq 2$, $0.01 \leq y \leq 2$, $0.01 \leq z \leq 3$ and $x+y+z \leq 5$.

5. The catalyst according to claim 1, which is a catalyst for fuel cells.

6. A process for producing a catalyst as claimed in claim 1, comprising supporting the catalyst metal on the catalyst carrier.

7. The process for producing the catalyst according to claim 6, wherein the catalyst metal is supported using a precursor of the catalyst.

8. The catalyst according to claim 1, wherein the catalyst metal comprises metal particles having an average particle diameter of 1 to 20 nm.

9. A catalyst comprising a catalyst carrier comprising a metal oxycarbonitride and a catalyst metal supported on the catalyst carrier,
wherein the catalyst metal comprises metal particles having an average particle diameter of 1 to 20 nm.

10. The catalyst according to claim 9, wherein the metal of the metal oxycarbonitride is at least one metal selected from the group consisting of niobium, tin, indium, platinum, tantalum, zirconium, copper, iron, tungsten, chromium, molybdenum, hafnium, titanium, vanadium, cobalt, manganese, mercury, plutonium, gold, silver, iridium, palladium, yttrium, ruthenium, lanthanum, cerium, praseodymium, neodymium, promethium, samarium, europium, gadolinium, terbium, dysprosium, holmium, erbium, thulium, ytterbium, lutetium, and nickel.

11. The catalyst according to claim 9, wherein the metal of the metal oxycarbonitride is niobium.

12. The catalyst according to claim 9, wherein the metal oxycarbonitride has a composition represented by $MC_xN_yO_z$ in which M is at least one metal selected from the group consisting of niobium, tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, praseodymium, neodymium, promethium, samarium, europium, gadolinium, terbium, dysprosium, holmium, erbium, thulium, ytterbium, lutetium, and nickel, x, y and z are each a proportion of each atomic number and satisfy $0.01 \leq x \leq 2$, $0.01 \leq y \leq 2$, $0.01 \leq z \leq 3$ and $x+y+z \leq 5$.

13. The catalyst according to claim 9, which is a catalyst for fuel cells.

14. A process for producing a catalyst as claimed in claim 9, comprising supporting a catalyst metal on a catalyst carrier.

15. The process for producing the catalyst according to claim 14, wherein the catalyst metal is supported using a precursor of the catalyst.

* * * * *